(12) United States Patent
Holemans

(10) Patent No.: US 9,981,446 B2
(45) Date of Patent: May 29, 2018

(54) STRUCTURAL INSERTS FOR HONEYCOMB STRUCTURES

(71) Applicant: The Boeing Company, Chicago, IL (US)

(72) Inventor: Peter Holemans, Sewell, NJ (US)

(73) Assignee: THE BOEING COMPANY, Chicago, IL (US)

( * ) Notice: Subject to any disclaimer, the term of this patent is extended or adjusted under 35 U.S.C. 154(b) by 666 days.

(21) Appl. No.: 14/016,691

(22) Filed: Sep. 3, 2013

(65) Prior Publication Data

US 2015/0298423 A1 Oct. 22, 2015

(51) Int. Cl.
| | |
|---|---|
| *F16B 5/01* | (2006.01) |
| *B32B 3/12* | (2006.01) |
| *B32B 5/18* | (2006.01) |
| *B32B 15/04* | (2006.01) |
| *B32B 3/06* | (2006.01) |

(Continued)

(52) U.S. Cl.
CPC .................. *B32B 3/12* (2013.01); *B32B 3/06* (2013.01); *B32B 3/08* (2013.01); *B32B 3/266* (2013.01); *B32B 5/18* (2013.01); *B32B 15/04* (2013.01); *B64C 1/06* (2013.01); *B64C 1/12* (2013.01); *B64C 1/18* (2013.01); *F16B 5/01* (2013.01); *B32B 2250/03* (2013.01); *B32B 2250/40* (2013.01); *B32B 2262/101* (2013.01); *B32B 2262/106* (2013.01); *B32B 2307/546* (2013.01); *B32B 2419/00* (2013.01); *B32B 2605/08* (2013.01); *B32B 2605/10* (2013.01); *B32B 2605/12* (2013.01); *B32B 2605/16* (2013.01); *B32B 2605/18* (2013.01); *B32B 2607/00* (2013.01); *B33Y 80/00* (2014.12); *B64C 2001/0072* (2013.01); *Y02T 50/433* (2013.01)

(58) Field of Classification Search
CPC ... F16B 5/01; B32B 3/266; B32B 3/06; B64C 1/12
See application file for complete search history.

(56) References Cited

U.S. PATENT DOCUMENTS 3,339,609 A * 9/1967 Cushman .................. B64C 1/12
249/93
3,766,636 A 10/1973 Sygnator
(Continued)

FOREIGN PATENT DOCUMENTS

DE 4411519 C1 * 11/1995 ............... F16B 5/01
DE 102011018526 A1 10/2012
(Continued)

OTHER PUBLICATIONS

Notification of Publication of Patent Application for Invention, dated Mar. 25, 2015, regarding Application No. 2014104434599, 4 pages.

(Continued)

*Primary Examiner* — Brian M O'Hara
(74) *Attorney, Agent, or Firm* — Yee & Associates, P.C.

(57) ABSTRACT

A method and apparatus for manufacturing a sandwich structure. A cavity is formed in a core of the sandwich structure. A structural insert is placed into the cavity. The structural insert comprises a first number of parts configured to receive a load and a second number of parts assembled with the first number of parts to form the structural insert.

20 Claims, 23 Drawing Sheets

(51) Int. Cl.
*B32B 3/08* (2006.01)
*B64C 1/06* (2006.01)
*B32B 3/26* (2006.01)
*B64C 1/12* (2006.01)
*B64C 1/18* (2006.01)
*B64C 1/00* (2006.01)
*B33Y 80/00* (2015.01)

(56) References Cited

U.S. PATENT DOCUMENTS

| | | | | |
|---|---|---|---|---|
| 4,273,818 | A * | 6/1981 | Buchs | B29D 24/005 136/292 |
| 7,195,436 | B1 * | 3/2007 | Stephen | F16B 5/01 411/373 |
| 8,950,969 | B2 * | 2/2015 | Klaukien | F16B 5/01 244/131 |
| 2009/0220320 | A1 | 9/2009 | Zhang | |
| 2012/0219355 | A1 * | 8/2012 | Masuda | F16B 5/01 403/265 |
| 2012/0251235 | A1 | 10/2012 | Klaukien | |
| 2013/0043344 | A1 | 2/2013 | Ruonavaara et al. | |

FOREIGN PATENT DOCUMENTS

| | | |
|---|---|---|
| EP | 1024301 A2 | 8/2000 |
| EP | 2080612 A1 | 7/2009 |
| JP | S5543897 A | 3/1980 |
| JP | 2009512822 A | 3/2009 |
| JP | 2012171568 A | 9/2012 |
| WO | 0024559 A1 | 5/2000 |
| WO | WO2005106258 A1 | 11/2005 |

OTHER PUBLICATIONS

Extended European Search Report, dated Apr. 24, 2015, regarding Application No. EP14177034.7, 8 pages.

Canadian Intellectual Property Office Examination Report, dated Feb. 5, 2015, regarding Application No. 2,859,329, 4 pages.

State Intellectual Property Office of PRC Notification of First Office Action, dated Aug. 2, 2017, regarding Application No. 201410442459.9, 22 pages.

Japanese Patent Office Notice of Reasons for Rejection, dated Mar. 20, 2018, regarding Application No. 2014-169095, 8 pages.

* cited by examiner

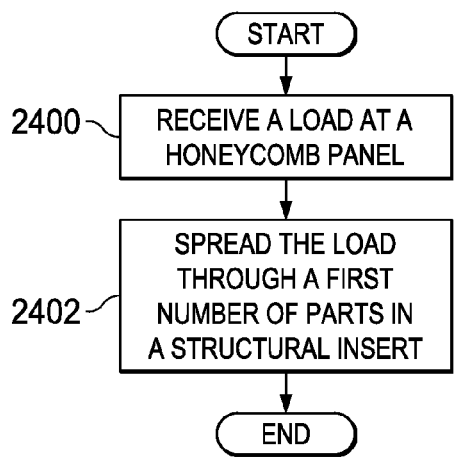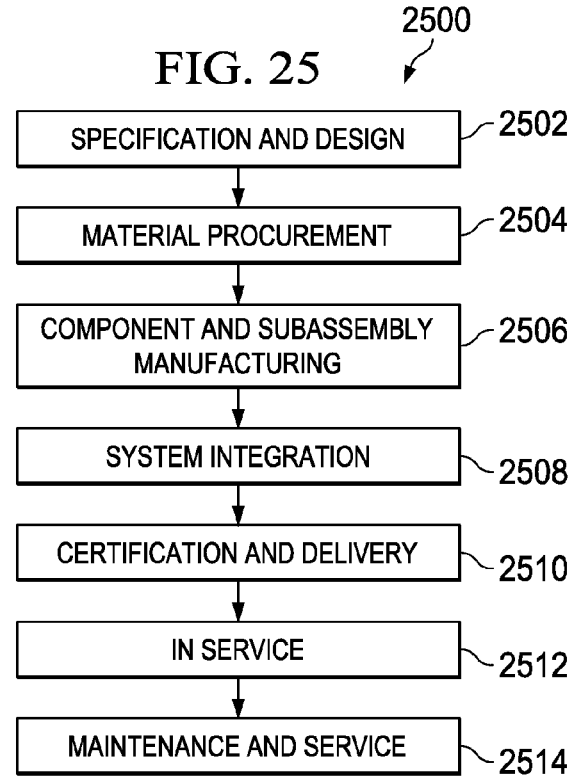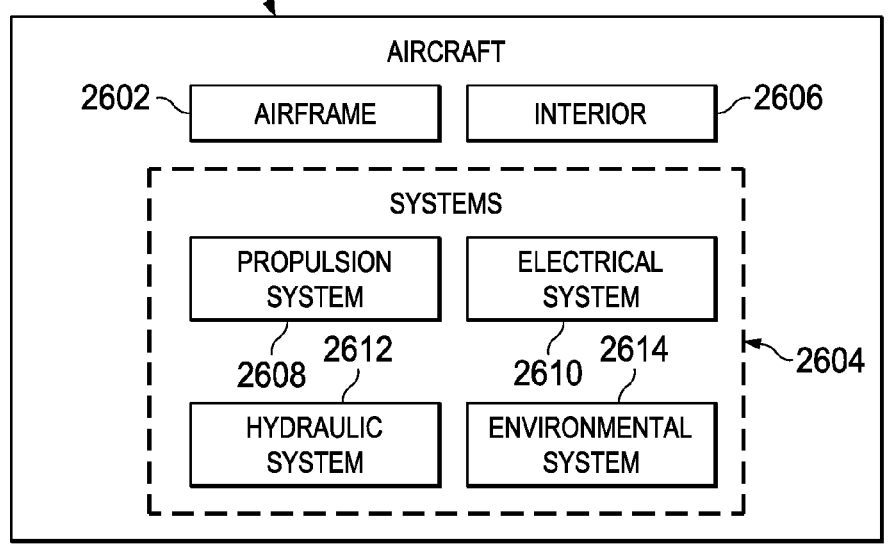

STRUCTURAL INSERTS FOR HONEYCOMB STRUCTURES

BACKGROUND INFORMATION

1. Field

The present disclosure relates generally to aircraft and, in particular, to structures in aircraft. Still more particularly, the present disclosure relates to a method and apparatus for structural inserts configured to receive loads in honeycomb structures in aircraft.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. As another example, honeycomb structures are a class of composite materials. A honeycomb structure may be a honeycomb sandwich structure. With this type of structure, two layers are attached on either side of a core. These layers may be considered a skin for the honeycomb sandwich structure. A honeycomb sandwich structure typically has a honeycomb structure.

With this type of structure, a desired level of bending stiffness may be achieved with a lower density as compared to a structure that uses a solid core or one comprised of a solid panel. The lower density may result in a desired weight savings for an aircraft.

These honeycomb sandwich structures, however, may not carry loads in a desired manner when loads are applied to one of the skins of these honeycomb sandwich structures. One manner in which additional loadbearing capability may be provided for a honeycomb sandwich structure is through the use of a potted core.

Potting a honeycomb core is a process in which open areas in the honeycomb core are filled with a material. This material may be a potting material or compound such as a resin.

Introducing a potting material into a honeycomb core, however, may be more time-consuming than desired. For example, a potting material may be placed into the core and cured. Additional potting material is placed into the core and cured. Thereafter, the excess material may be removed through sanding, machining, or other processes. In some cases, additional material may be introduced after the sanding or machining.

This type of process may be more time-consuming and expensive than desired. Further, the use of a potting material also may result in more weight than desired. Therefore, it would be desirable to have a method and apparatus that take into account at least some of the issues discussed above, as well as other possible issues.

SUMMARY

In one illustrative embodiment, an apparatus comprises a first number of parts and a second number of parts. The first number of parts is configured to receive a load. The second number of parts is configured to be assembled with the first number of parts to form a structural insert for a sandwich structure.

In another illustrative embodiment, a honeycomb panel comprises a first skin, a second skin, a honeycomb core, and a structural insert. The honeycomb core is located between the first skin and the second skin. The structural insert is located in a cavity in the honeycomb core. The structural insert has a first number of parts configured to receive a load and a second number of parts.

In yet another illustrative embodiment, a method for manufacturing a sandwich structure is provided. A cavity is formed in a core of the sandwich structure. A structural insert is placed into the cavity. The structural insert comprises a first number of parts configured to receive a load and a second number of parts assembled with the first number of parts to form the structural insert.

In still another illustrative embodiment, a method for handling a load in an aircraft is provided. The load is received at a honeycomb panel. The honeycomb panel comprises a first skin, a second skin, a honeycomb core, and a structural insert. The honeycomb core is located between the first skin and the second skin. The structural insert is located in a cavity in the honeycomb core. The structural insert has a first number of parts configured to receive the load and a second number of parts. The load is spread through the first number of parts in the structural insert.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 24 is an illustration of a flowchart of a process for handling a load in an aircraft in accordance with an illustrative embodiment;

FIG. 25 is an illustration of a block diagram of an aircraft manufacturing and service method in accordance with an illustrative embodiment; and FIG. 26 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that one alternative to filling the honeycomb structure with a resin, such as potting, may be the use of inserts. For example, the illustrative embodiments recognize and take into account that a composite insert may be placed into an area of a honeycomb sandwich panel to receive a load.

The illustrative embodiments recognize and take into account, however, that with using a solid insert, the amount of weight of the honeycomb sandwich panel may be greater than desired. This situation may reduce the fuel efficiency for performance of an aircraft.

The illustrative embodiments recognize and take into account that with the use of rapid prototyping systems, a customized structural insert may be designed and manufactured for use in a honeycomb sandwich panel that results in less weight. For example, different parts may be manufactured using an additive manufacturing process. These parts may be assembled to form the structural inserts that receive a load in a desired manner for the honeycomb sandwich panel. This type of process is more precise as compared to filling portions of a honeycomb structure with a resin or other type of potting material.

Thus, in one illustrative embodiment, an apparatus comprises a first number of parts configured to receive a load and a second number of parts configured to be assembled with the first number of parts to form a structural insert for a sandwich structure.

Figure 1:
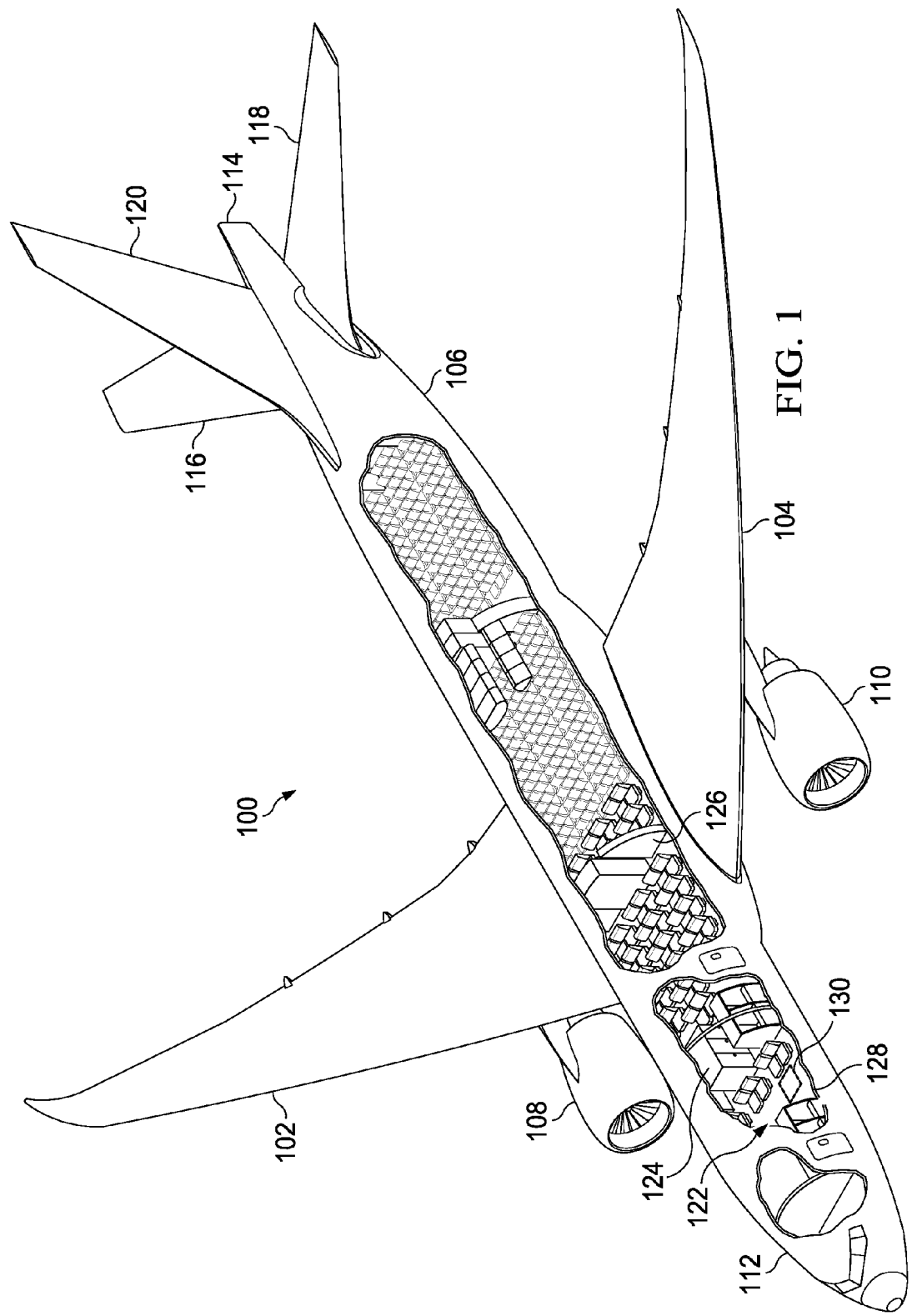
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of an aircraft in which a sandwich structure may be implemented in accordance with an illustrative embodiment. For example, an illustrative embodiment may be implemented in interior 122 of aircraft 100. For example, sandwich structures may be implemented in various parts such as closet 124, wall 126, and floor 128, as well as in other parts or monuments that may be present in interior 122 of aircraft 100. A more detailed illustration of section 130 of floor 128 is described below.

The illustration of aircraft 100 is not meant to limit the manner in which different illustrative embodiments may be implemented. For example, an illustrative embodiment may be implemented platforms other than aircraft 100. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, or some other suitable type of platform.

Figure 2:
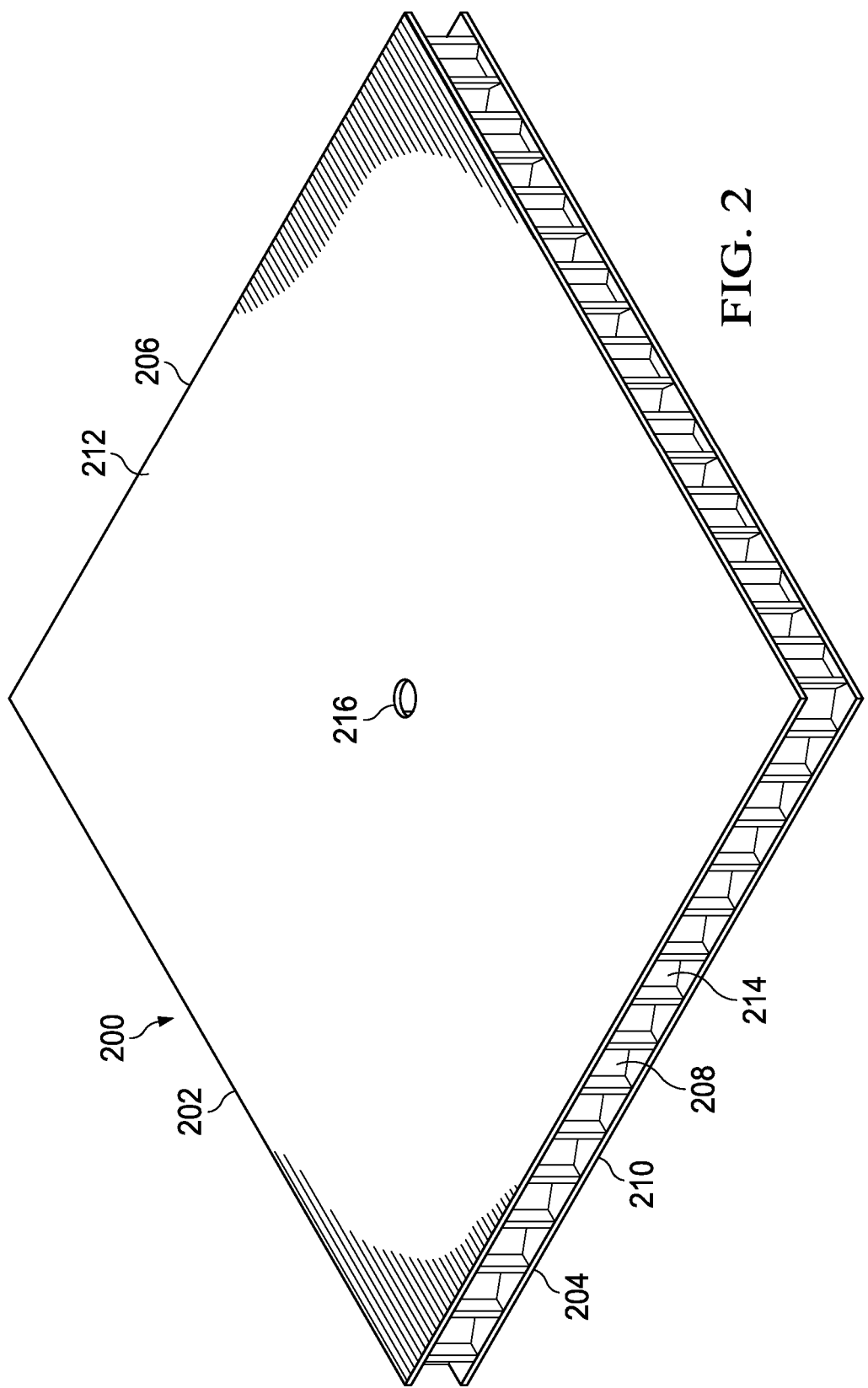
FIG. 2 is a more detailed illustration of a section of a floor in an aircraft in accordance with an illustrative embodiment.

With reference next to FIG. 2, a more detailed illustration of a section of a floor in an aircraft is depicted in accordance with an illustrative embodiment. As depicted, a more detailed view of section 130 of floor 128 in aircraft 100 in FIG. 1 is shown.

In this illustrative example, sandwich structure 200 takes the form of honeycomb sandwich panel 202. As shown in this example, honeycomb sandwich panel 202 is comprised of first layer 204, second layer 206, and core 208.

In the illustrative example, core 208 is located between first layer 204 and second layer 206. As depicted, core 208 is attached to first layer 204 and second layer 206.

First layer 204 forms first skin 210 and second layer 206 forms second skin 212 for honeycomb sandwich panel 202. Core 208 takes the form of honeycomb core 214 in this particular example.

As depicted, honeycomb sandwich panel 202 has hole 216. Hole 216 in honeycomb sandwich panel 202 may receive a fastener (not shown) to attach honeycomb sandwich panel 202 to another structure (not shown) in aircraft 100. This attachment may result in the application of a load to honeycomb sandwich panel 202 during operation of aircraft 100.

Figure 3:
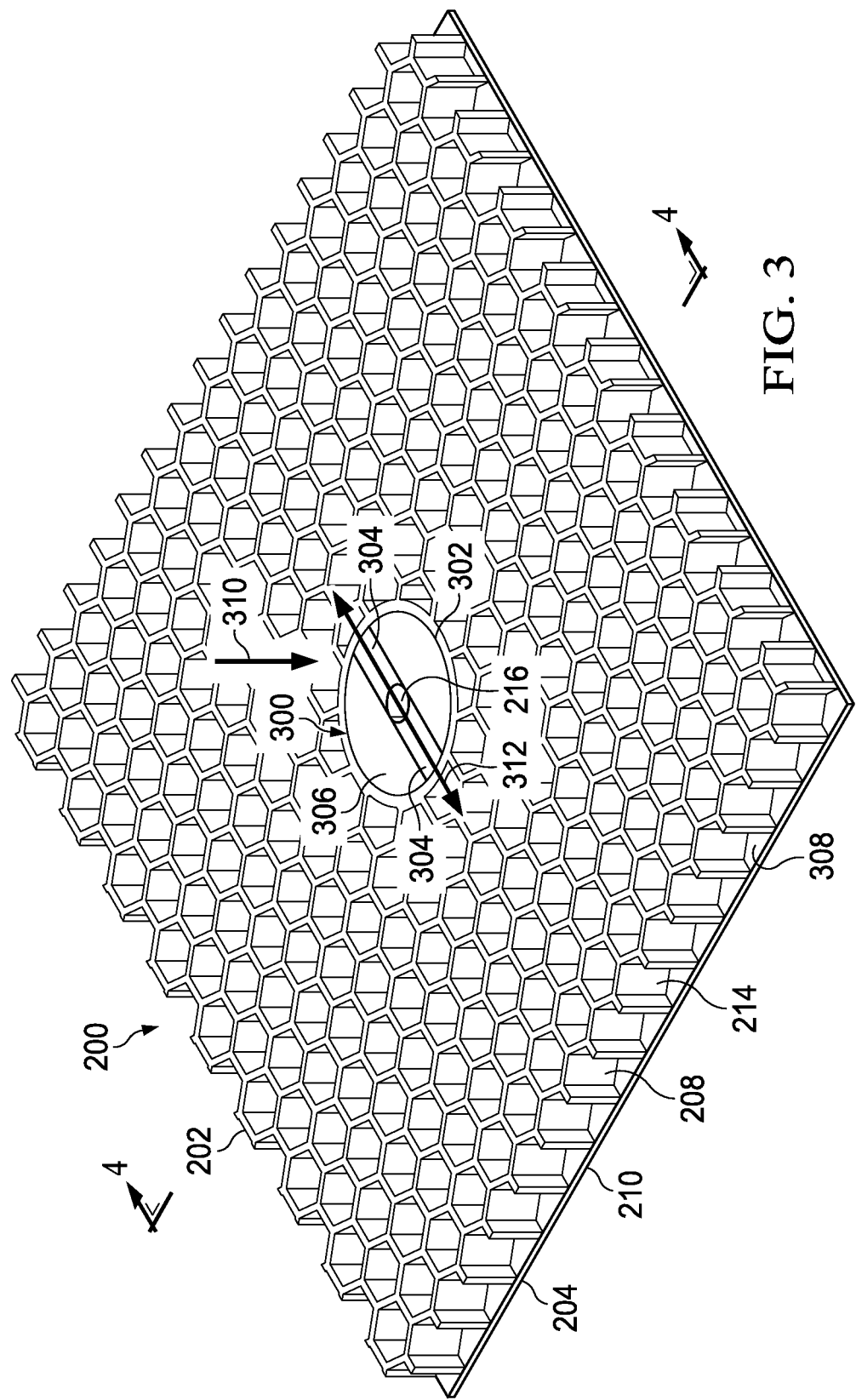
FIG. 3 is an illustration of a honeycomb sandwich structure in accordance with an illustrative embodiment.

Turning next to FIG. 3, an illustration of a honeycomb sandwich structure is depicted in accordance with an illustrative embodiment. As depicted, an exposed view of sandwich structure 200 is shown. In this view, second layer 206 has been removed from view.

As can be seen in this exposed view, structural insert 300 is located in cavity 302 of core 208 in sandwich structure 200. Cavity 302 is configured to receive structural insert 300.

As depicted, structural insert 300 has a circular cross section and is comprised of first number of parts 304 and second number of parts 306. Second number of parts 306 is configured to be assembled with first number of parts 304 to form structural insert 300 in sandwich structure 200. As used herein, "a number of," used with reference to items, means one or more items. For example, first number of parts 304 means one or more parts.

In the illustrative example, structural insert 300 is configured to spread a load across a surface of structural insert 300. For example, the load may be spread across surface 308 of first layer 204 in sandwich structure 200. As depicted, first number of parts 304 in structural insert 300 is configured to receive the load. Without structural insert 300, the configuration of sandwich structure 200 may be less efficient with respect to spreading a load across surface 308 of sandwich structure 200.

In these illustrative examples, first number of parts 304, second number of parts 306, or both may be manufactured using an additive manufacturing process. The additive manufacturing process may be, for example, three dimensional printing. A design of an object made using software, such as a computer-aided design (CAD) program or some other suitable software, may then be used to print the object.

In this particular example, first number of parts 304 has a shape that is configured to spread a load applied to structural insert 300. For example, the load may be applied in the direction of arrow 310, which is substantially perpendicular to core 208. The load may be spread in the direction of arrow 312 in the illustrative example. In other illustrative examples, the load may be applied from the opposite side shown with respect to arrow 310. In other illustrative examples, the load may be applied in other directions other than with respect to arrow 310.

Figure 4:
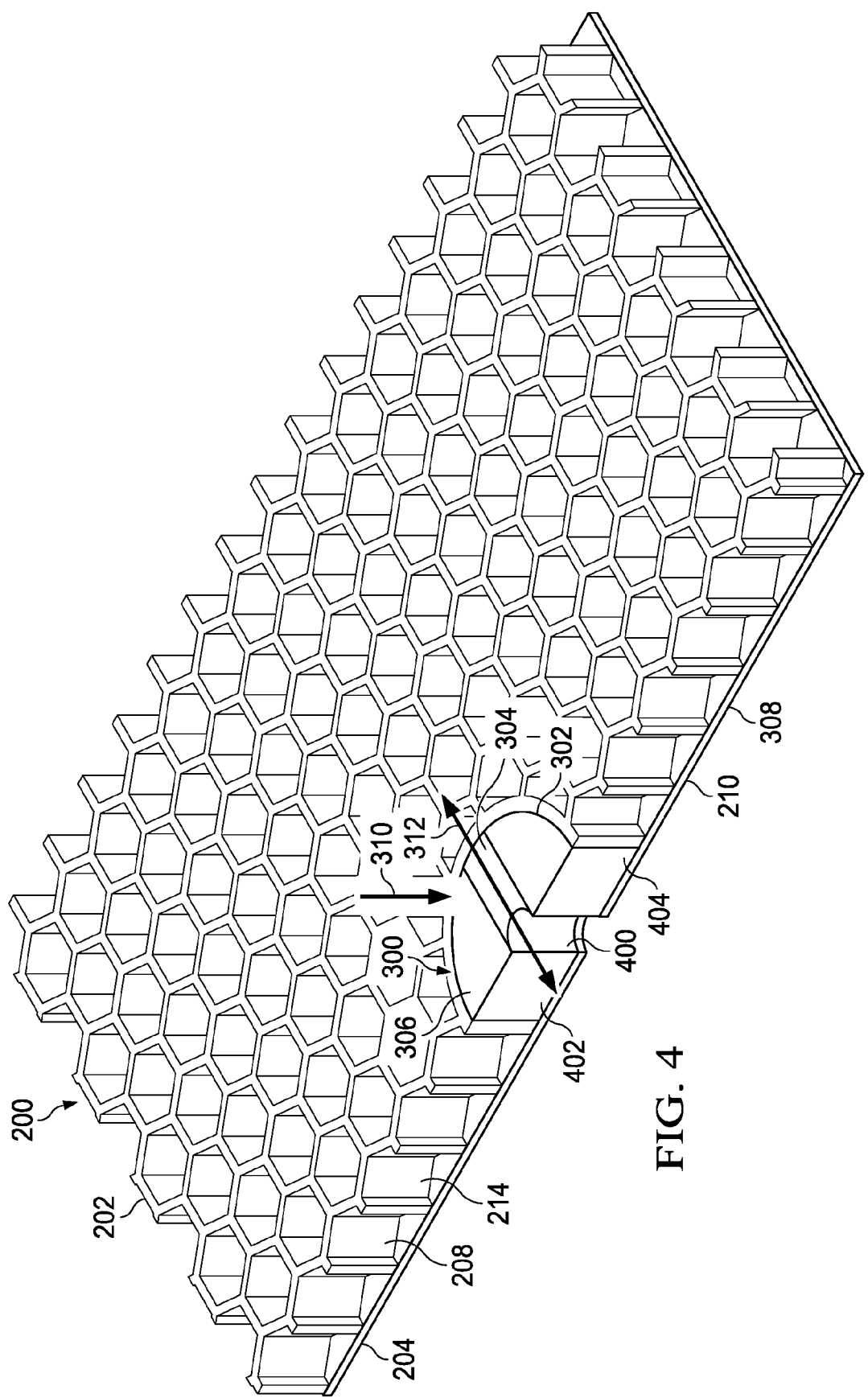
FIG. 4 is an illustration of a cross-sectional view of a sandwich structure in accordance with an illustrative embodiment.

Turning next to FIG. 4, an illustration of a cross-sectional view of a sandwich structure is depicted in accordance with an illustrative embodiment. A cross-sectional view of sandwich structure 200 is seen taken along lines 4-4 in FIG. 3.

In this view, first number of parts 304 includes part 400. Second number of parts 306 includes part 402 and part 404. In this illustrative example, part 400 fits in between part 402 and part 404. Part 400, part 402, and part 404 are located in cavity 302 in core 208. For example, these parts may be placed into cavity 302 already assembled in the desired arrangement. In other illustrative examples, the parts may be assembled prior to being placed into cavity 302.

Figure 5:
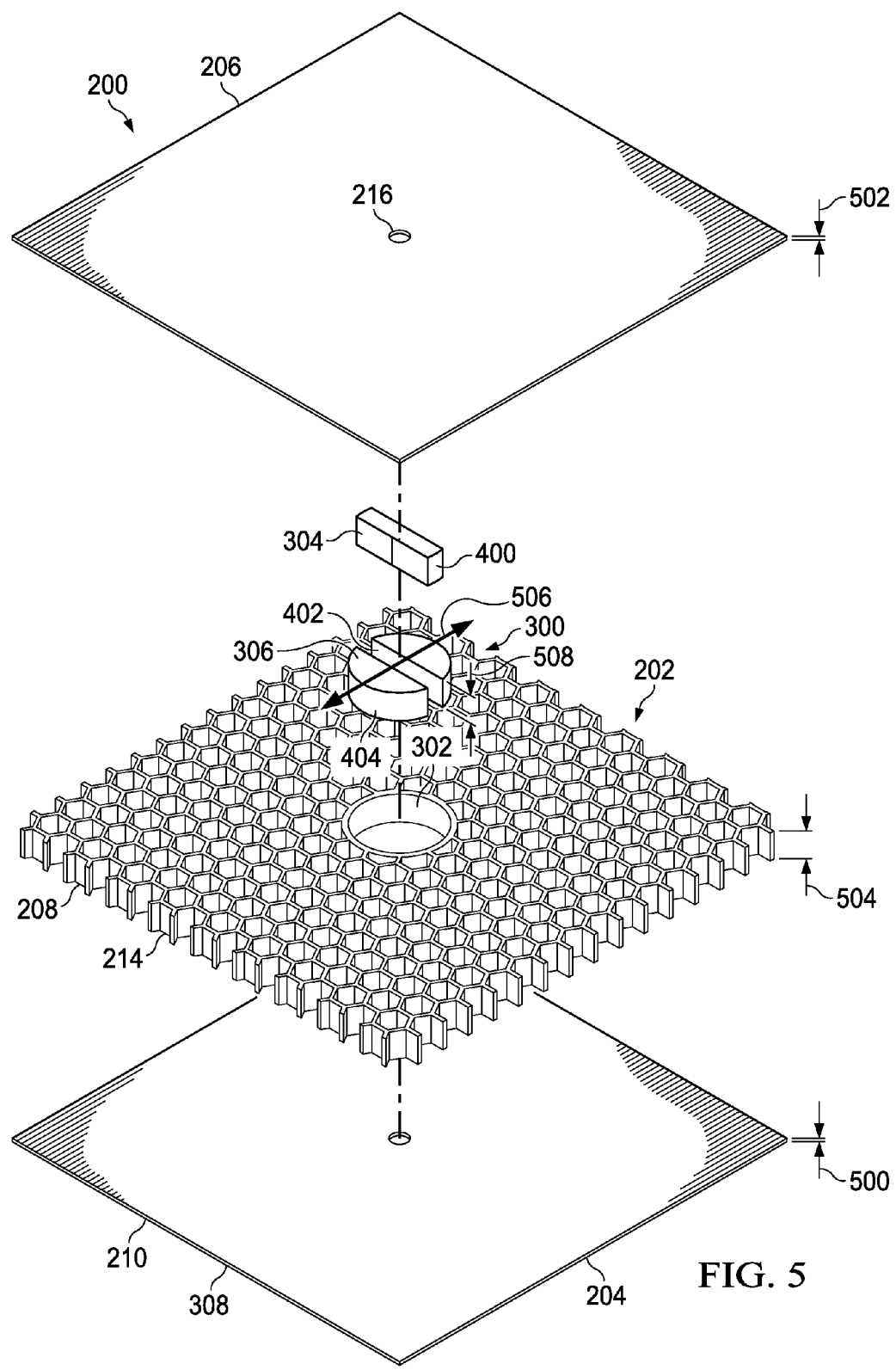
FIG. 5 is an illustration of an exploded view of a sandwich structure in accordance with an illustrative embodiment.

Turning next to FIG. 5, an illustration of an exploded view of a sandwich structure is depicted in accordance with an illustrative embodiment. In this figure, an exploded view of sandwich structure 200 in FIG. 2 is shown.

As depicted, first layer 204 and second layer 206 may be comprised of aluminum. Honeycomb core 214 may be comprised of fiberglass. First number of parts 304 in structural insert 300 may be comprised of graphite. Second number of parts 306 in structural insert 300 may be comprised of a composite material.

As depicted, first layer 204 has thickness 500, second layer 206 has thickness 502, and honeycomb core 214 has thickness 504. In this illustrative example, structural insert 300 has diameter 506 and thickness 508.

In this illustrative example, these various dimensions may vary depending on the particular implementation. As shown, thickness 500 is about 0.1 inches, thickness 502 is about 0.1 inches, and thickness 504 is about 1.0 inches. Diameter 506 is about 3.0 inches and thickness 508 is about 1.0 inches.

Figure 6:
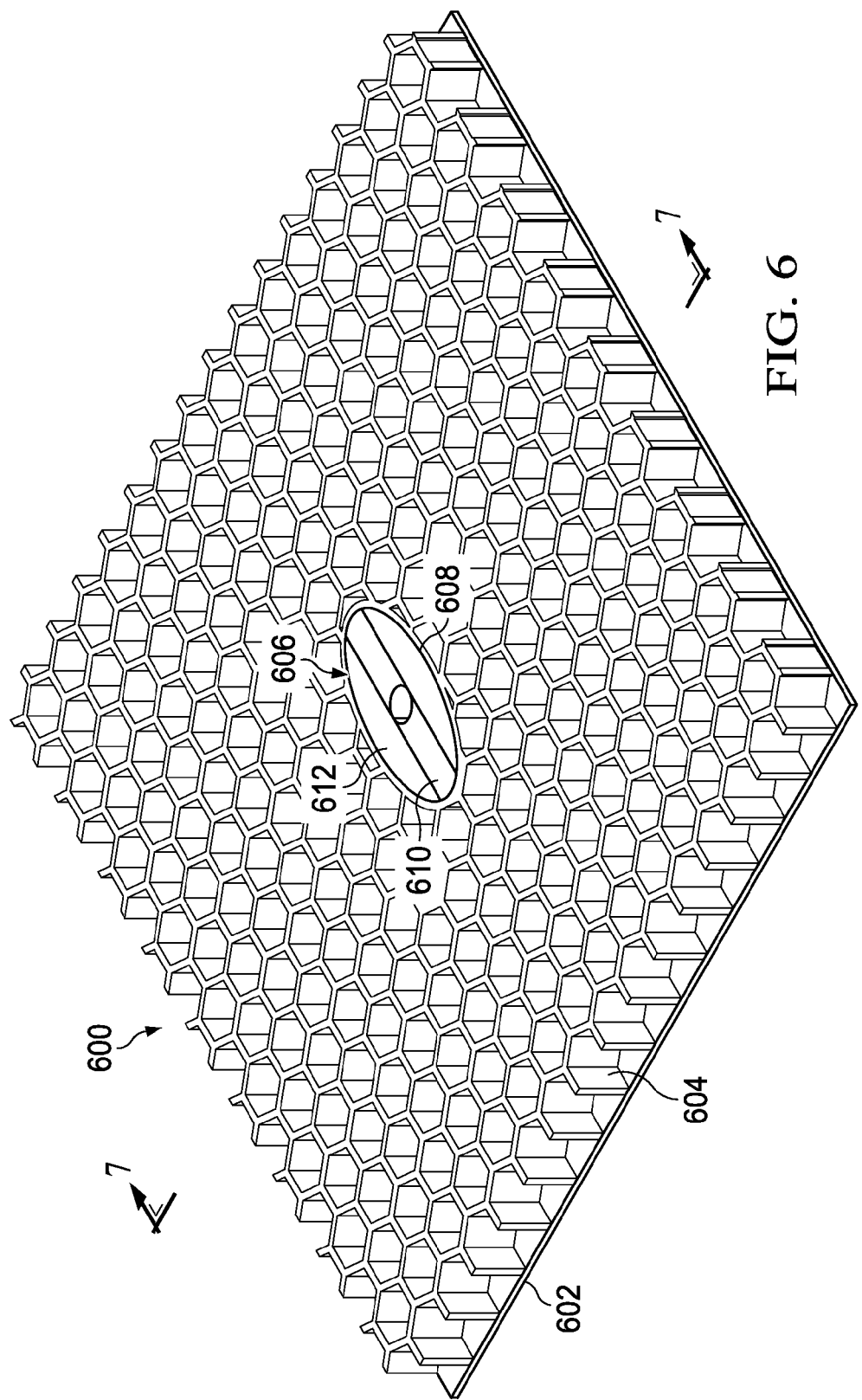
FIG. 6 is an illustration of a sandwich structure with a structural insert in accordance with an illustrative embodiment.

With reference now to FIG. 6, an illustration of a sandwich structure with a structural insert is depicted in accordance with an illustrative embodiment. In this depicted example, an exposed view of sandwich structure 600 is depicted. Sandwich structure 600 is another illustrative example of a sandwich structure that may be used in section 130 of floor 128 in aircraft 100 in FIG. 1.

As depicted in this exposed view, sandwich structure 600 includes first layer 602, core 604, and structural insert 606. A second layer for sandwich structure 600 is not shown in this exposed view.

In this illustrative example, structural insert 606 is located in cavity 608 in core 604 of sandwich structure 600. As depicted, structural insert 606 has an ellipsoid cross section.

Structural insert 606 is comprised of first number of parts 610 and second number of parts 612. First number of parts 610 is configured to receive a load that may be applied to sandwich structure 600.

Figure 7:
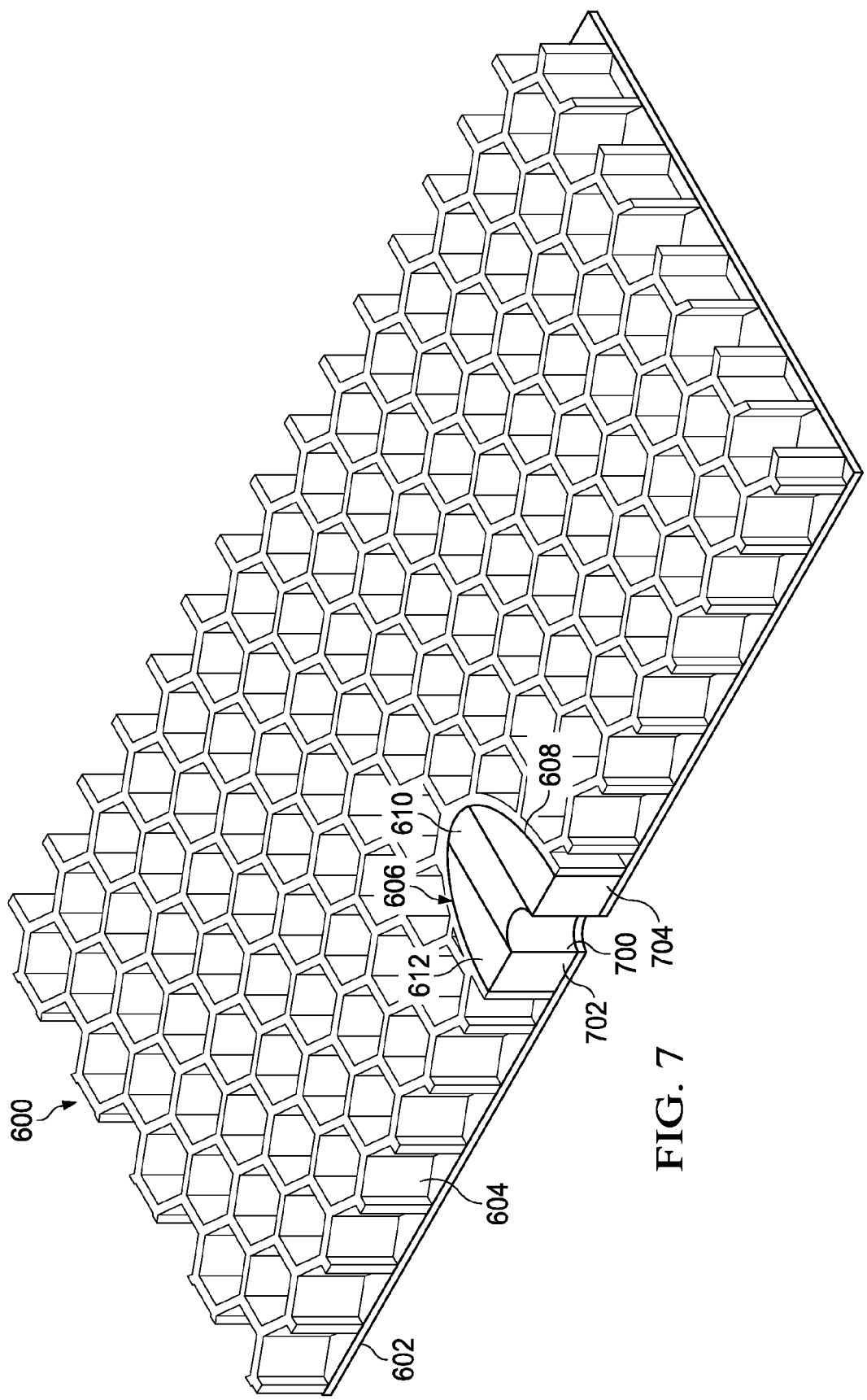
FIG. 7 is an illustration of a cross-sectional view of a sandwich structure in accordance with an illustrative embodiment.

With reference next to FIG. 7, an illustration of a cross-sectional view of a sandwich structure is depicted in accordance with an illustrative embodiment. A cross-sectional view of sandwich structure 600 is seen taken along lines 7-7 in FIG. 6.

In this view, first number of parts 610 includes part 700. Second number of parts 612 includes part 702 and part 704.

Figure 8:
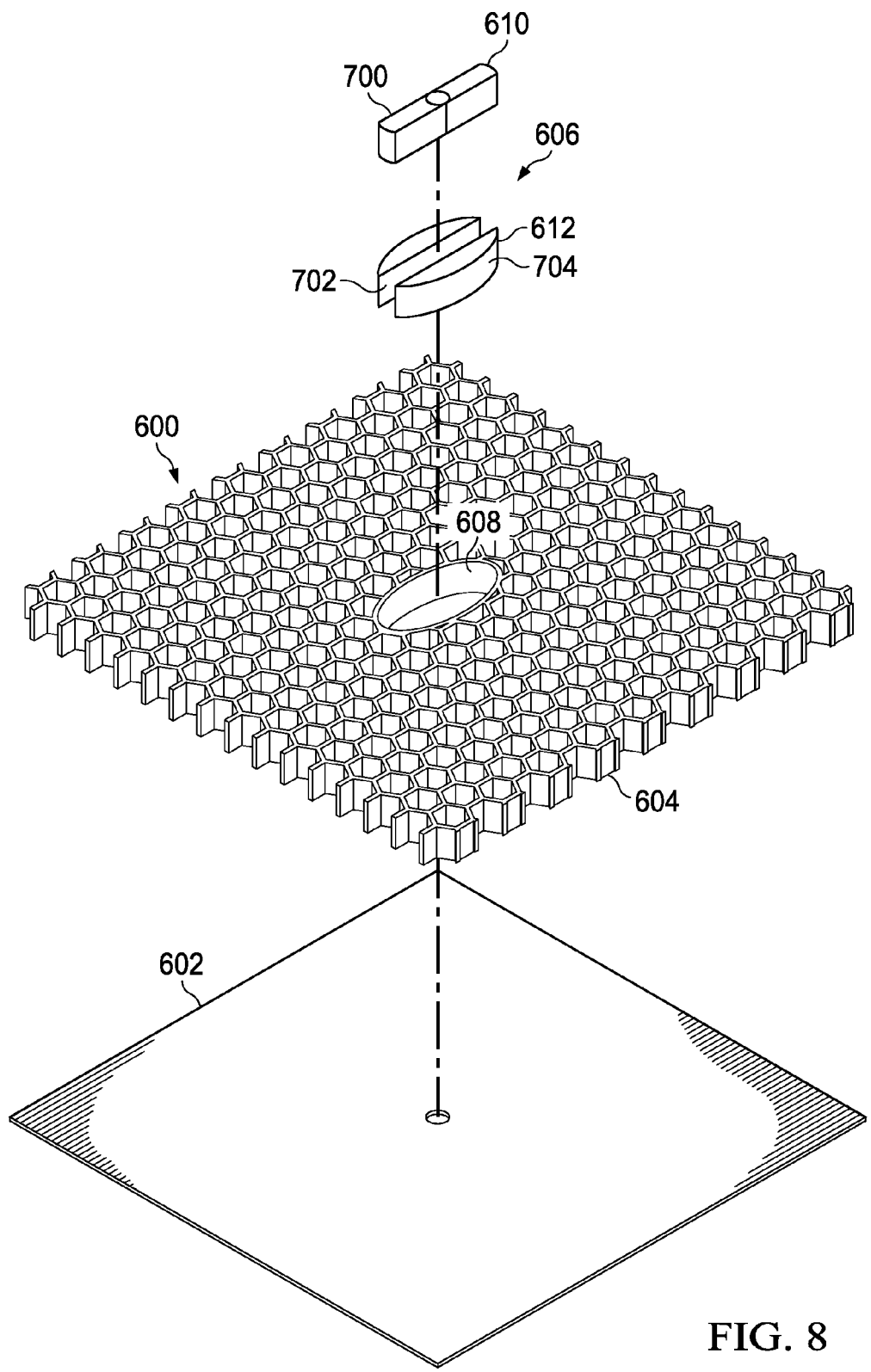
FIG. 8 is an illustration of an exploded view of a sandwich structure in accordance with an illustrative embodiment.

Turning next to FIG. 8, an illustration of an exploded view of a sandwich structure is depicted in accordance with an illustrative embodiment. In this figure, an exploded view of sandwich structure 600 in FIG. 6 is shown.

Figure 9:
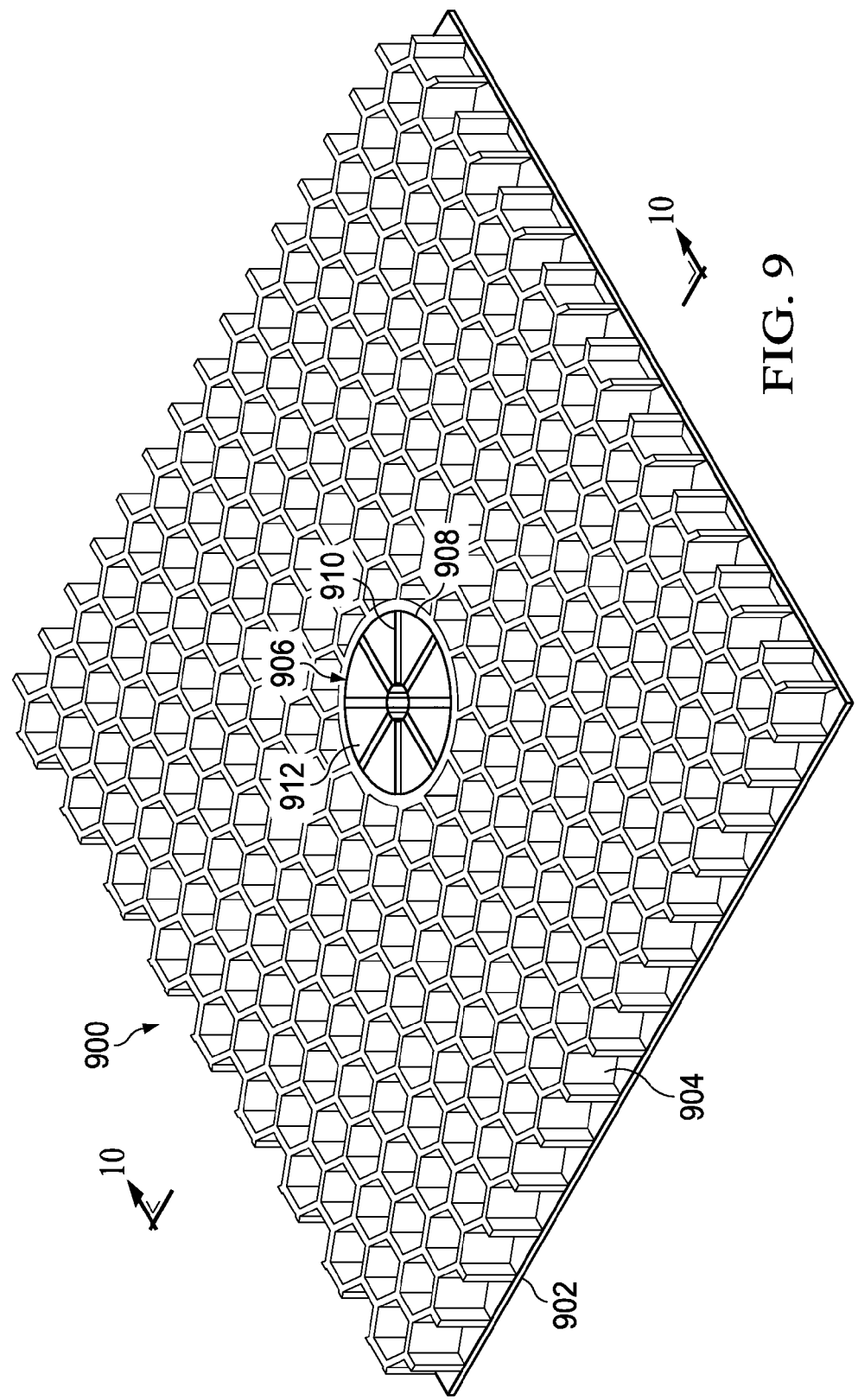
FIG. 9 is an illustration of a sandwich structure with a structural insert in accordance with an illustrative embodiment.

With reference now to FIG. 9, an illustration of a sandwich structure with a structural insert is depicted in accordance with an illustrative embodiment. In this depicted example, an exposed view of sandwich structure 900 is depicted. As depicted, sandwich structure 900 is yet another illustrative example of a sandwich structure that may be used in section 130 of floor 128 in aircraft 100 in FIG. 1.

In this exposed view, sandwich structure 900 includes first layer 902, core 904, and structural insert 906. The second layer for sandwich structure 900 is not shown in this exposed view.

In this illustrative example, structural insert 906 is located in cavity 908 in core 904 of sandwich structure 900. As depicted, structural insert 906 has a circular cross-section.

Structural insert 906 is comprised of first number of parts 910 and second number of parts 912. First number of parts 910 is configured to receive a load that may be applied to sandwich structure 900.

Figure 10:
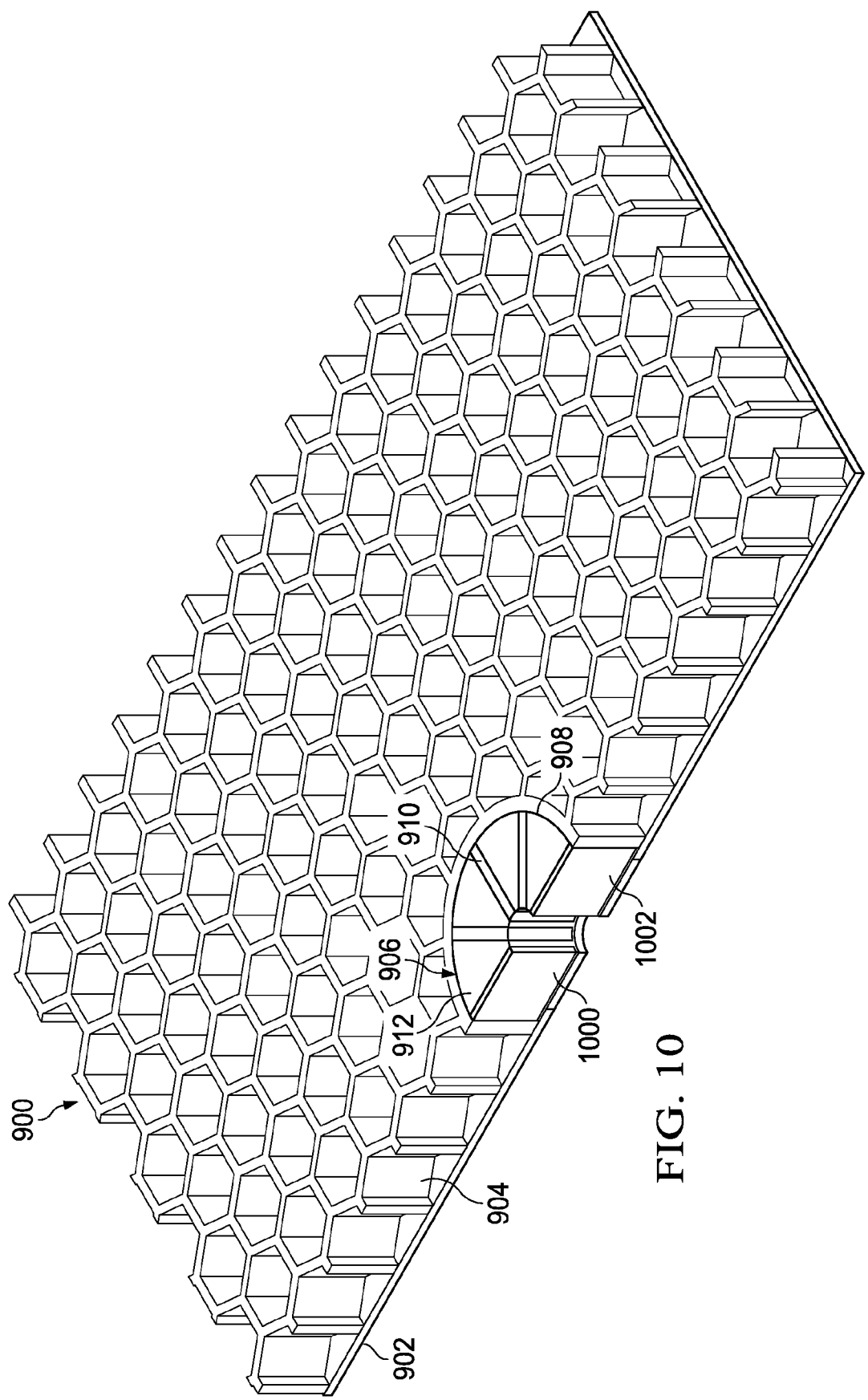
FIG. 10 is an illustration of a cross-sectional view of a sandwich structure in accordance with an illustrative embodiment.

With reference next to FIG. 10, an illustration of a cross-sectional view of a sandwich structure is depicted in accordance with an illustrative embodiment. A cross-sectional view of sandwich structure 900 is seen taken along lines 10-10 in FIG. 9.

In this view, first number of parts 910 includes part 1000. Second number of parts 912 includes part 1002. As depicted, part 1000 is configured to be placed within part 1002. In this illustrative example, this assembly of part 1000 in part 1002 forms structural insert 906.

Figure 11:
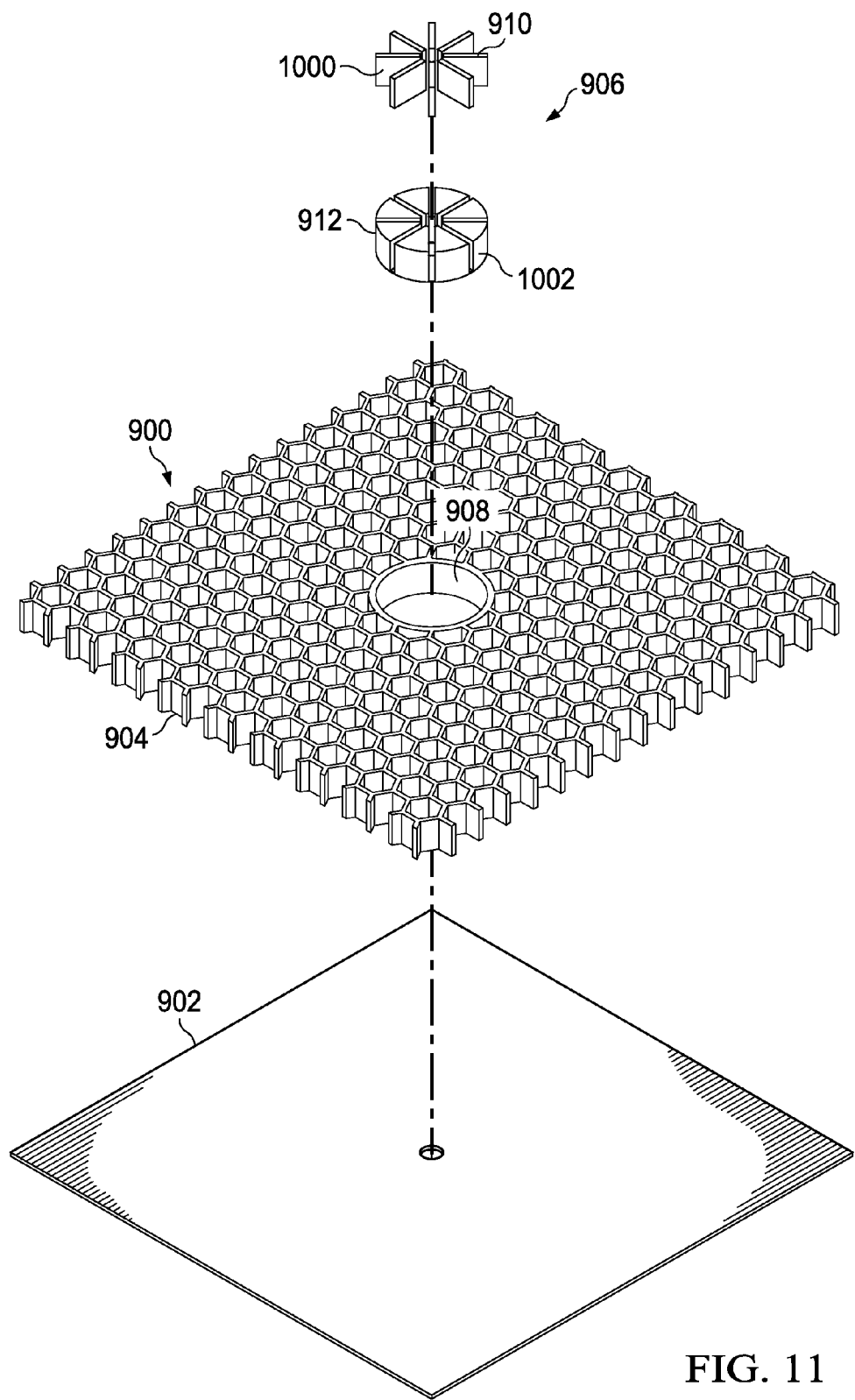
FIG. 11 is an illustration of an exploded view of a sandwich structure in accordance with an illustrative embodiment.

Turning next to FIG. 11, an illustration of an exploded view of a sandwich structure is depicted in accordance with an illustrative embodiment. In this figure, an exploded view of sandwich structure 900 in FIG. 9 is shown.

Figure 12:
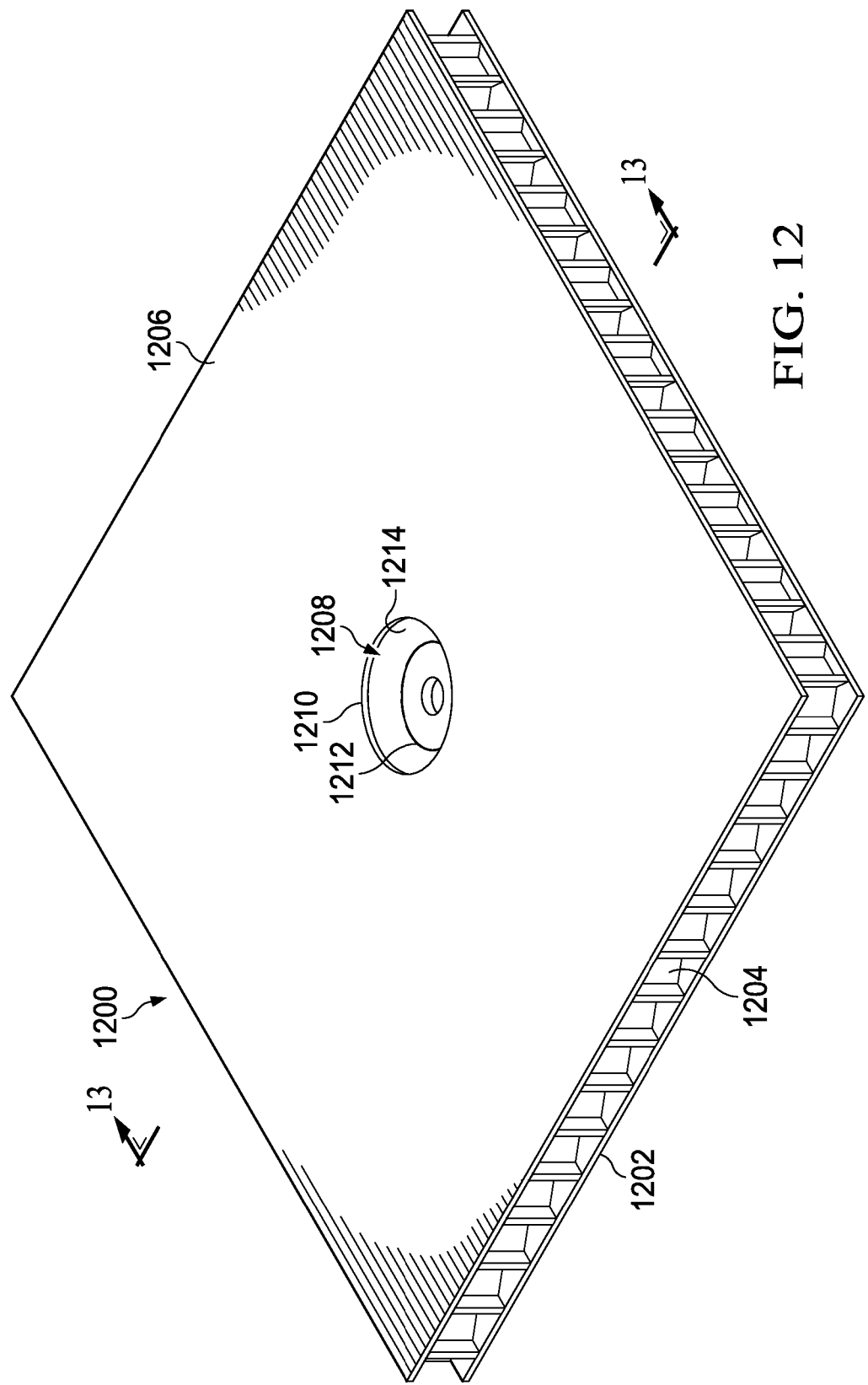
FIG. 12 is an illustration of a sandwich structure with a structural insert in accordance with an illustrative embodiment.

With reference next to FIG. 12, an illustration of a sandwich structure with a structural insert is depicted in accordance with an illustrative embodiment. In this depicted example, a view of sandwich structure 1200 is depicted. As depicted, sandwich structure 1200 is another illustrative example of a sandwich structure that may be used in section 130 of floor 128 in aircraft 100 in FIG. 1.

In this view, sandwich structure 1200 includes first layer 1202, core 1204, second layer 1206, and structural insert 1208. As depicted, structural insert 1208 is located in cavity 1210 in core 1204 of sandwich structure 1200. As depicted, structural insert 1208 has a circular cross-section.

Structural insert 1208 is comprised of first number of parts 1212 and second number of parts 1214. First number of parts 1212 is configured to receive a load that may be applied to sandwich structure 1200.

Figure 13:
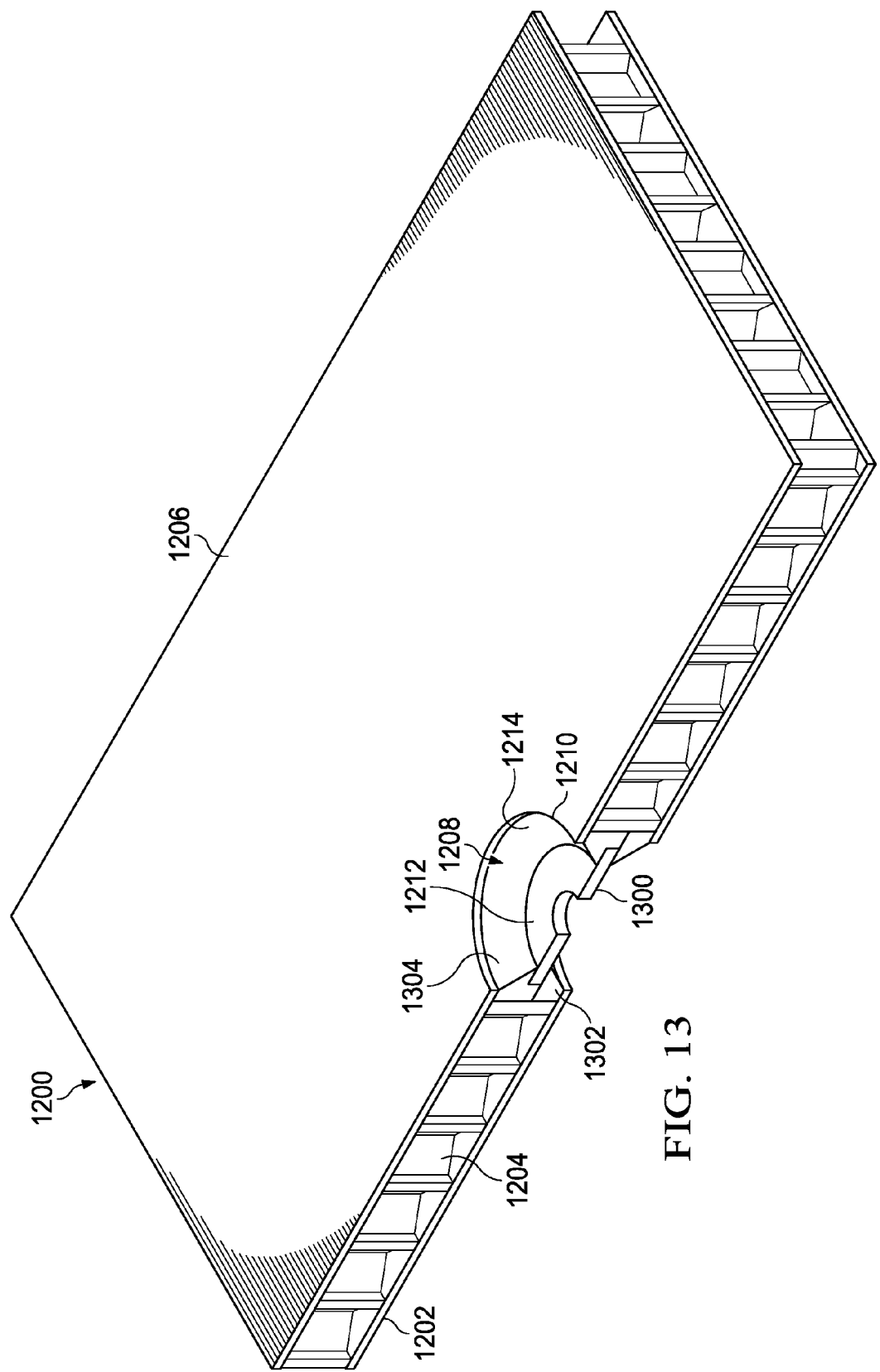
FIG. 13 is an illustration of a cross-sectional view of a sandwich structure in accordance with an illustrative embodiment.

In FIG. 13, an illustration of a cross-sectional view of a sandwich structure is depicted in accordance with an illustrative embodiment. A cross-sectional view of sandwich structure 1200 is seen taken along lines 13-13 in FIG. 12.

In this depicted view, first number of parts 1212 includes part 1300. Second number of parts 1214 includes part 1302 and part 1304. As can be seen, part 1300 is configured to be placed between part 1302 and part 1304. For example, part 1300 may be placed on part 1302. Thereafter, part 1304 may be placed over part 1302. This assembly of part 1304 and part 1302 is to hold part 1300 in place in the assembly that forms structural insert 1208.

Figure 14:
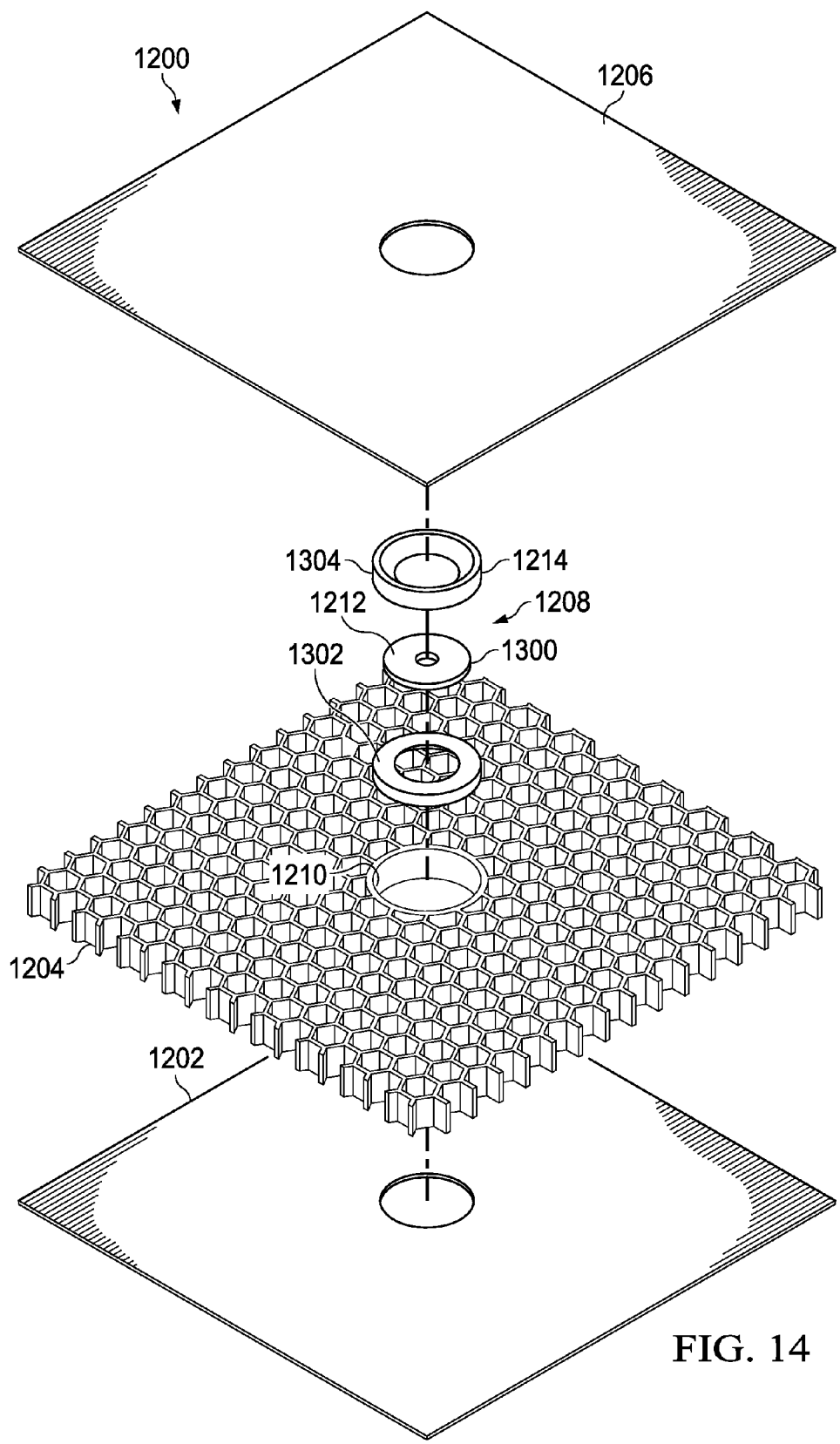
FIG. 14 is an illustration of an exploded view of a sandwich structure in accordance with an illustrative embodiment.

Turning to FIG. 14, an illustration of an exploded view of a sandwich structure is depicted in accordance with an illustrative embodiment. In this figure, an exploded view of sandwich structure 1200 in FIG. 12 is shown.

Figure 15:
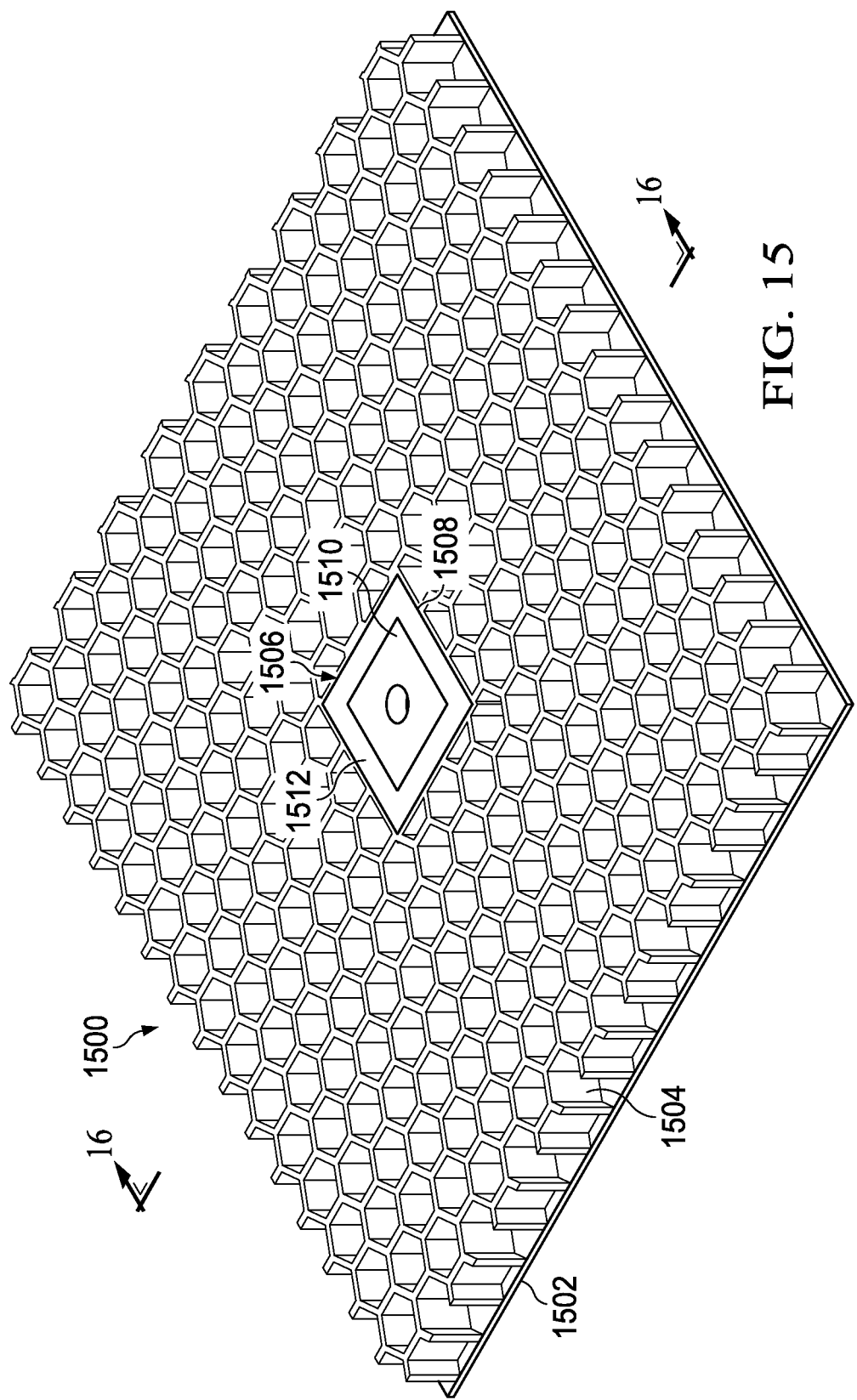
FIG. 15 is an illustration of a sandwich structure with a structural insert in accordance with an illustrative embodiment.

With reference next to FIG. 15, an illustration of a sandwich structure with a structural insert is depicted in accordance with an illustrative embodiment. In this depicted example, an exposed view of sandwich structure 1500 is depicted. Sandwich structure 1500 is another illustrative example of a sandwich structure that may be used in section 130 of floor 128 in aircraft 100 in FIG. 1.

As depicted in this exposed view, sandwich structure 1500 includes first layer 1502, core 1504, and structural insert 1506. A second layer for sandwich structure 1500 is not shown in this exposed view.

In this illustrative example, structural insert 1506 is located in cavity 1508 in core 1504 of sandwich structure 1500. As depicted, structural insert 1506 has a square cross-section.

Structural insert 1506 is comprised of first number of parts 1510 and second number of parts 1512. First number of parts 1510 is configured to receive a load that may be applied to sandwich structure 1500.

Figure 16:
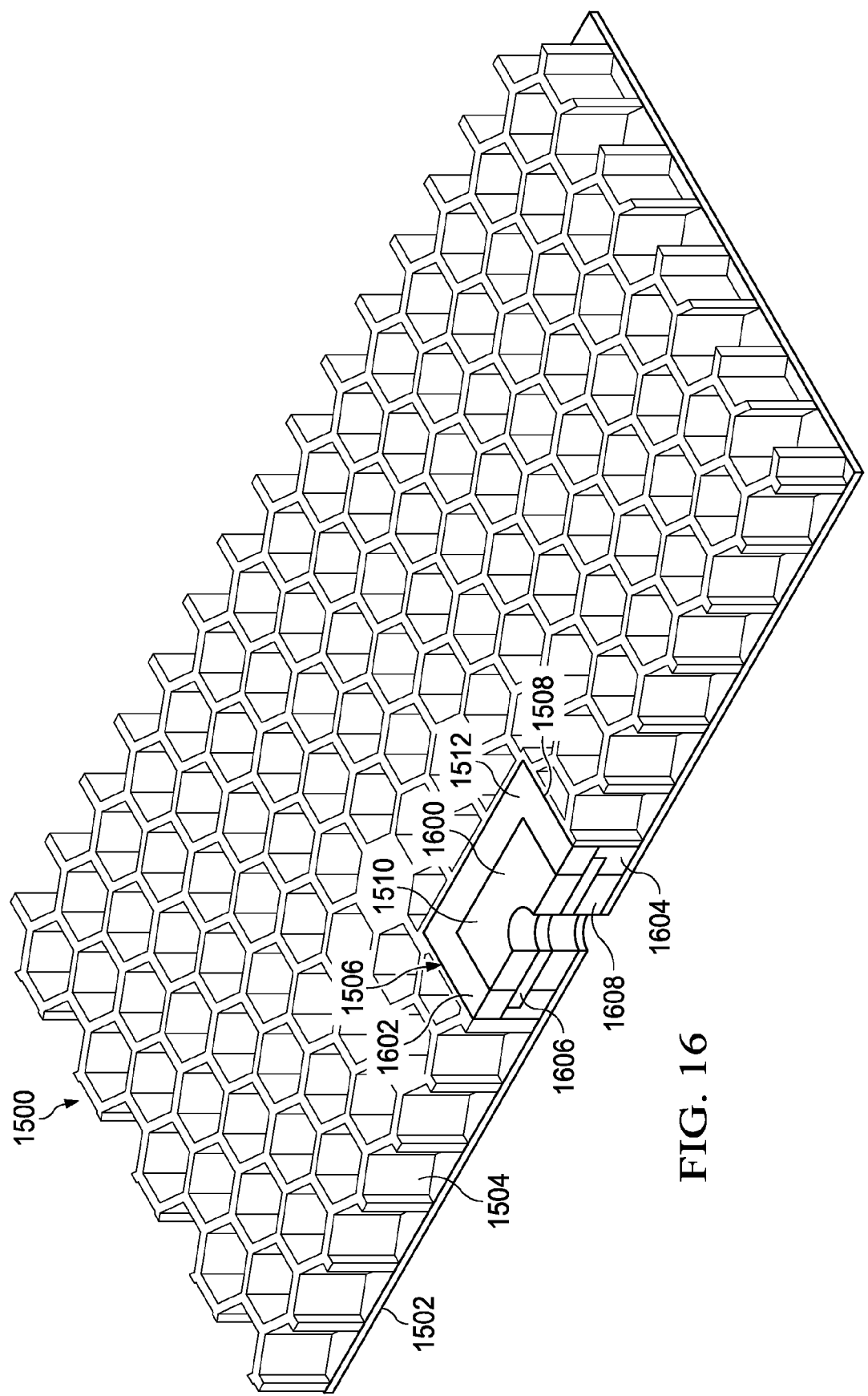
FIG. 16 is an illustration of a cross-sectional view of a sandwich structure in accordance with an illustrative embodiment.

With reference now to FIG. 16, an illustration of a cross-sectional view of a sandwich structure is depicted in accordance with an illustrative embodiment. A cross-sectional view of sandwich structure 1500 is seen taken along lines 16-16 in FIG. 15.

In this cross-sectional view, first number of parts 1510 includes part 1600. Second number of parts 1512 includes part 1602, part 1604, part 1606, and part 1608.

Figure 17:
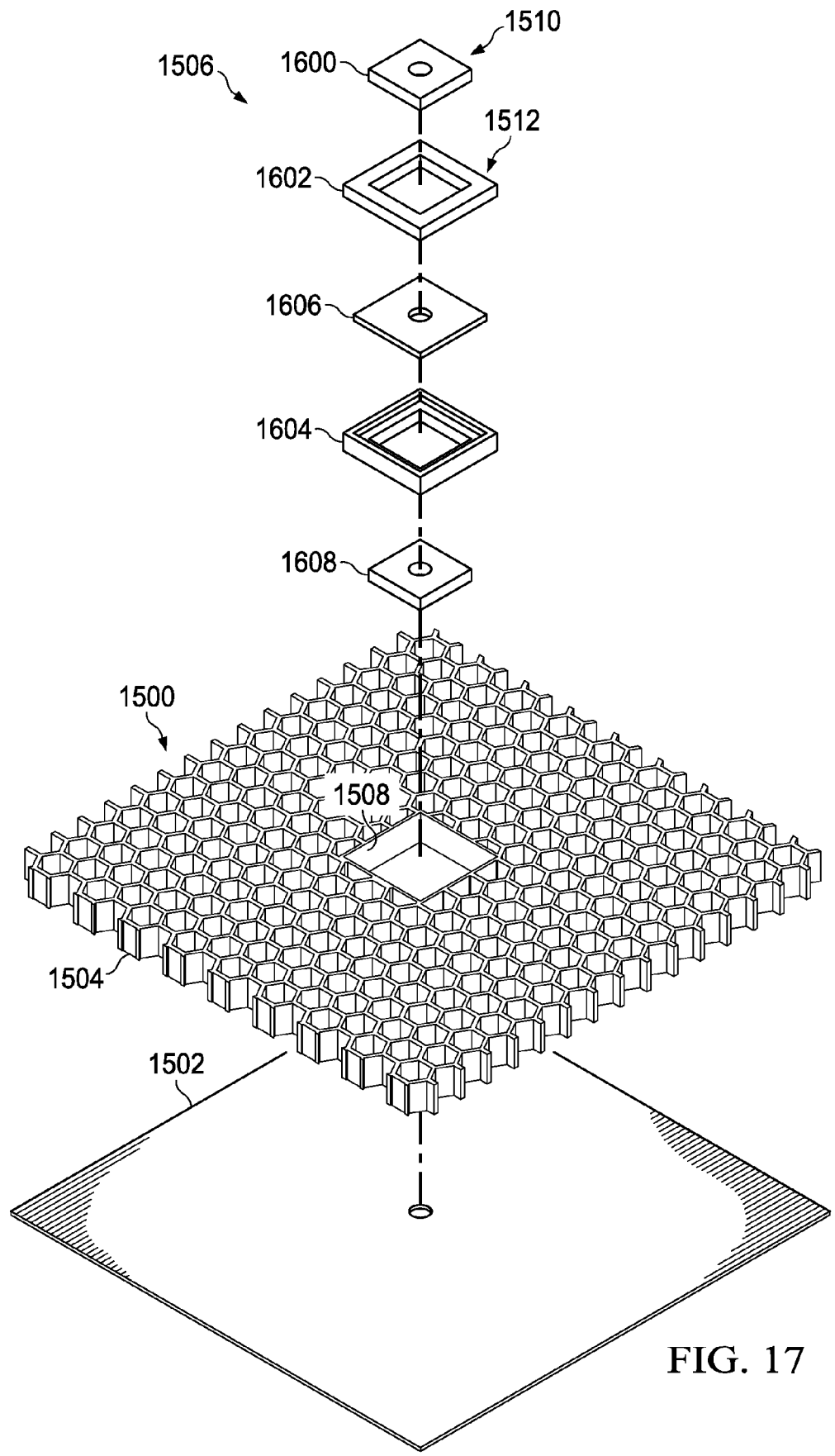
FIG. 17 is an illustration of an exploded view of a sandwich structure in accordance with an illustrative embodiment.

Turning next to FIG. 17, an illustration of an exploded view of a sandwich structure is depicted in accordance with an illustrative embodiment. In this figure, an exploded view of sandwich structure 1500 in FIG. 15 is shown.

Figure 18:
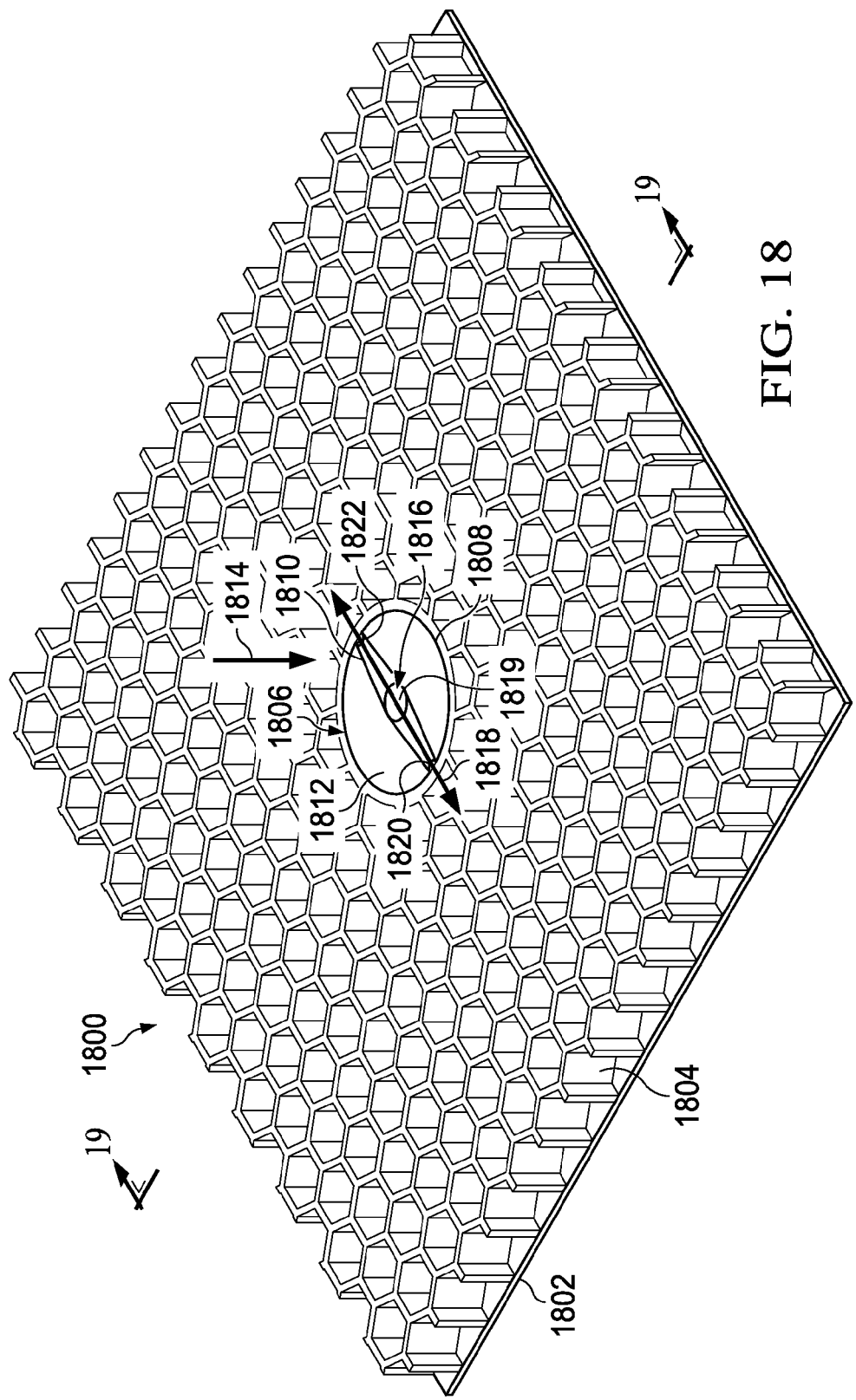
FIG. 18 is an illustration of a sandwich structure with a structural insert in accordance with an illustrative embodiment.

With reference now to FIG. 18, an illustration of a sandwich structure with a structural insert is depicted in accordance with an illustrative embodiment. In this depicted example, an exposed view of sandwich structure 1800 is depicted. As depicted, sandwich structure 1800 is still yet another illustrative example of a sandwich structure that may be used in section 130 of floor 128 in aircraft 100 in FIG. 1.

In this exposed view, sandwich structure 1800 includes first layer 1802, core 1804, and structural insert 1806. The second layer for sandwich structure 1800 is not shown in this exposed view.

In this illustrative example, structural insert 1806 is located in cavity 1808 in core 1804 of sandwich structure 1800. As depicted, structural insert 1806 has a circular cross-section.

Structural insert 1806 is comprised of first number of parts 1810 and second number of parts 1812. First number of parts 1810 is configured to receive a load that may be applied to sandwich structure 1800.

As depicted, first number of parts 1810 has a shape that is configured to spread a load applied to structural insert 1806. For example, the load may be applied in the direction of arrow 1814 at center 1816 of structural insert 1806, which is substantially perpendicular to core 1804. The load may be spread in the direction of arrow 1818 in the illustrative example.

In this illustrative example, the load is at a maximum near center 1816 of structural insert 1806 and then may decrease in the direction of arrow 1818 from center point 1819. Similarly, first number of parts 1810 has a shape that decreases in thickness in the direction of arrow 1818. The shape of first number of parts 1810, therefore, provides the greatest structural support near center 1816 of structural insert 1806 where the load is at a maximum and there is less structural support as the thickness of first number of parts 1810 decreases in the direction of arrow 1818. The shape of first number of parts 1810 may provide an increased weight savings while still providing sufficient structural support.

Additionally, first number of parts 1810 may have part 1820 and part 1822. Part 1820 and part 1822 are semicircular cutouts in this depicted example. In other illustrative examples, part 1820 and part 1822 may have a shape selected from one of a parabola, a triangle, an arc, or other shapes. Part 1820 and part 1822 remove material from first number of parts 1810 that may not be needed to distribute the load applied to structural insert 1806. In this manner, the density of first number of parts 1810 is changed to create a configuration that results in decreased weight of structural insert 1806. In other illustrative examples, the density of first number of parts 1810 may be changed by drilling holes, removing material, combining different materials, or other techniques.

Figure 19:
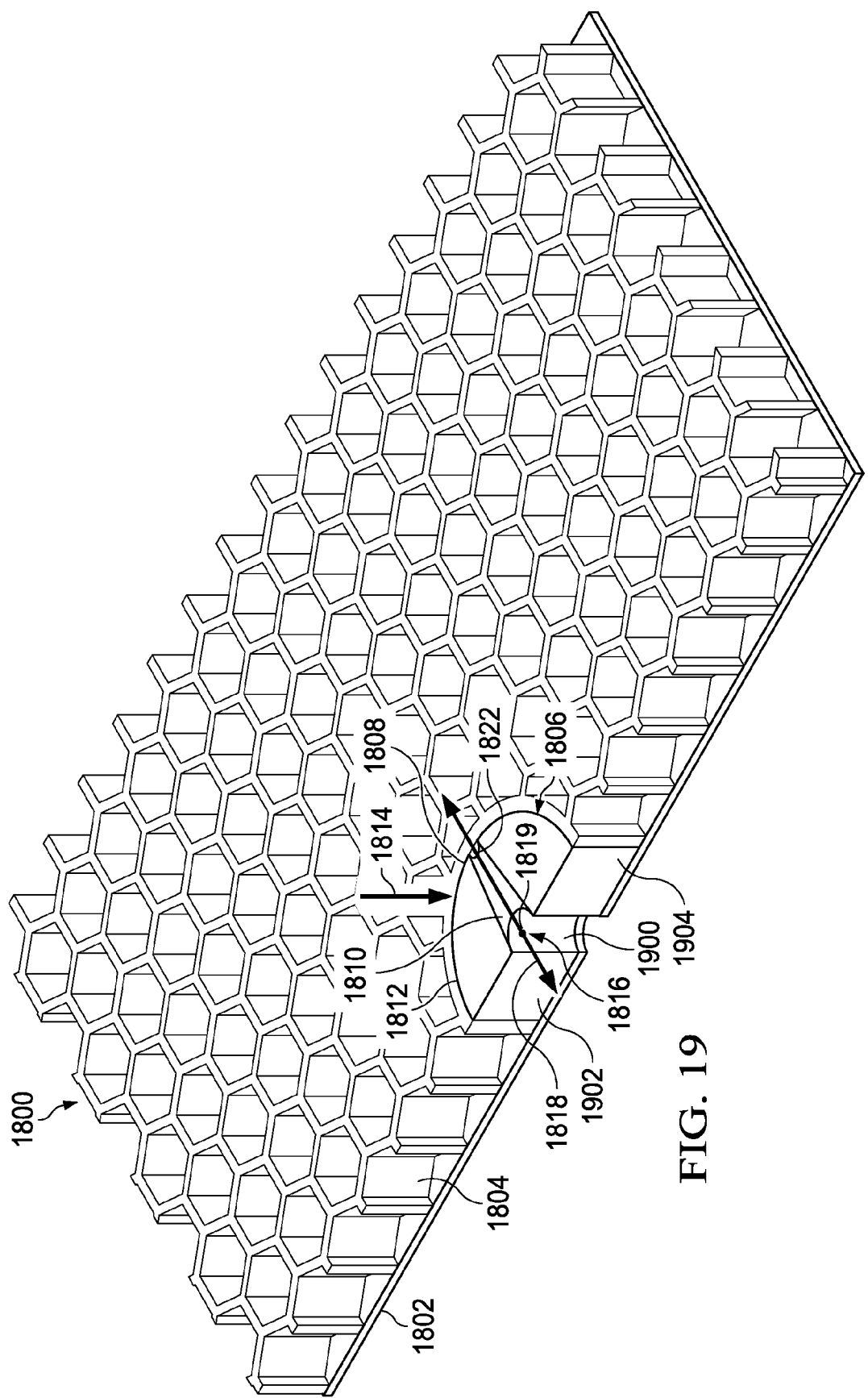
FIG. 19 is an illustration of a cross-sectional view of a sandwich structure in accordance with an illustrative embodiment.

With reference next to FIG. 19, an illustration of a cross-sectional view of a sandwich structure is depicted in accordance with an illustrative embodiment. A cross-sectional view of sandwich structure 1800 is seen taken along lines 19-19 in FIG. 18.

In this view, first number of parts 1810 includes part 1900. Second number of parts 1812 includes part 1902 and part 1904.

Figure 20:
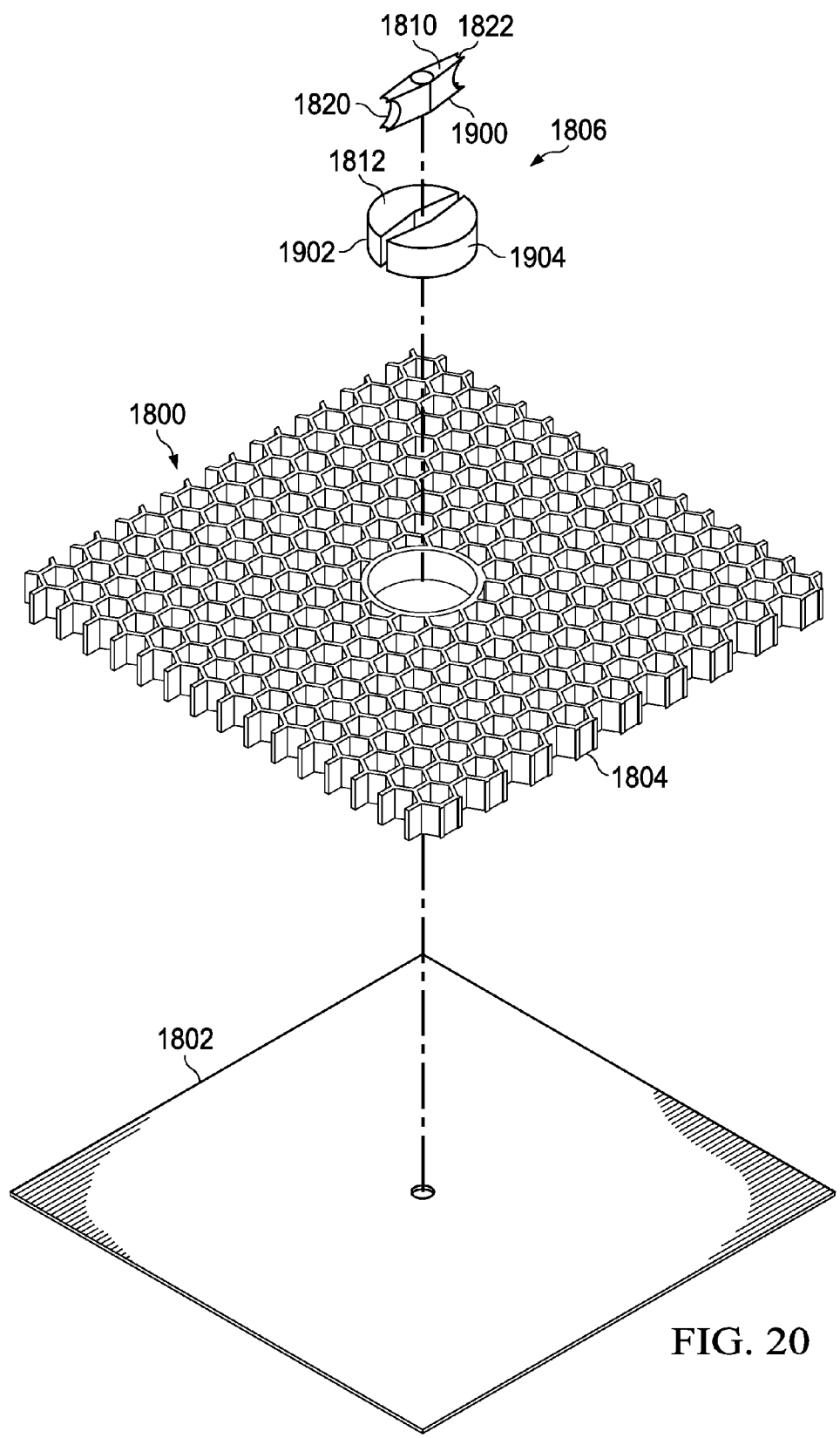
FIG. 20 is an illustration of an exploded view of a sandwich structure in accordance with an illustrative embodiment.

Turning next to FIG. 20, an illustration of an exploded view of a sandwich structure is depicted in accordance with an illustrative embodiment. In this figure, an exploded view of sandwich structure 1800 in FIG. 18 is shown.

The different illustrations of a sandwich structure with a structural insert in FIGS. 2-17 are only presented as illustrative examples of some implementations for a sandwich structure and a structural insert. These illustrations are not meant to limit the manner in which other illustrative embodiments may be implemented.

For example, although the sandwich structure has been depicted as having a first layer and a second layer with a core between the layers, the sandwich structure may have other configurations. For example, two layers may be present on either side of the core rather than just one layer as shown. Further, the layers may be formed from the same type of material or different types of materials. In other words, the first layer may be comprised of the same material as the second layer or different materials from the second layer.

As another example, although the sandwich structures are shown as being planar, sandwich structures may have other shapes. For example, sandwich structures may be curved rather than planar as depicted in these illustrative examples.

In still another illustrative example, one or more structural inserts may be used in addition to the structural inserts in the different illustrations. Further, although the structural insert is shown as being centrally located in the sandwich structure, the structural inserts may be placed in other locations in the sandwich structure.

Further, the different structural inserts may have shapes other than those depicted. For example, the structural concerts may have an excitable cross-section, an irregular cross section, or some other suitable shape. In still other illustrative examples, the structural inserts may have other forms such as a sphere, a frustrum, or other types of volumes.

Figure 21:
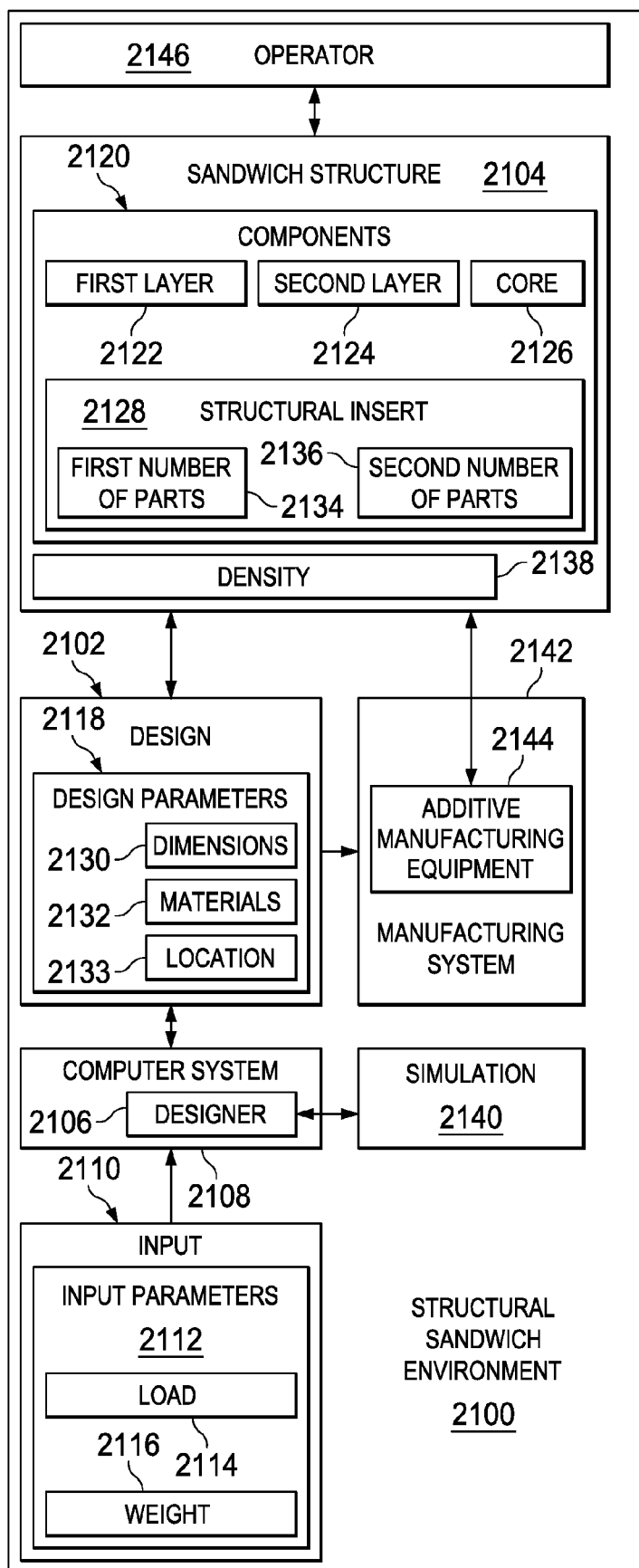
FIG. 21 is an illustration of a block diagram of a structural sandwich environment in accordance with an illustrative embodiment.

With reference now to FIG. 21, an illustration of a block diagram of a structural sandwich design environment is depicted in accordance with an illustrative embodiment. As depicted, structural sandwich environment 2100 is configured to generate design 2102 for sandwich structure 2104 and also may be used to manufacture sandwich structure 2104.

In the illustrative example, designer 2106 is configured to generate design 2102 and may be implemented in software, hardware, firmware or a combination thereof. When software is used, the operations performed by designer 2106 may be implemented in program code configured to run on a processor unit. When firmware is used, the operations performed by designer 2106 may be implemented in program code and data and stored in persistent memory to run on a processor unit. When hardware is employed, the hardware may include circuits that operate to perform the operations in designer 2106.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, designer 2106 is located in computer system 2108. Computer system 2108 is comprised of a number of computers. When more than one computer is present in computer system 2108, those computers may communicate with each other through a communications medium such as a network.

As depicted, designer 2106 may receive input 2110 for use in generating design 2102 for sandwich structure 2104. For example, input 2110 may include input parameters 2112. Input parameters 2112 may describe, for example, load 2114, weight 2116, and other suitable parameters.

In the illustrative example, load 2114 is one or more forces, formations, accelerations, or some combination thereof applied to sandwich structure 2104. Load 2114 may be caused by another structure. Input parameters 2112 for load 2114 may include a direction of the force, the magnitude of the force, and other suitable factors. The direction of the force may, for example, describe at least one of the spreading or desired spreading of the force on sandwich structure 2104.

Using input 2110, designer 2106 is configured to generate design 2102. In particular, designer 2106 may generate design parameters 2118 for sandwich structure 2104.

As depicted, design parameters 2118 may include various parameters. For example, design parameters 2118 may describe components 2120 in sandwich structure 2104. Components 2120 may include, for example, at least one of first layer 2122, second layer 2124, core 2126, and structural insert 2128 in sandwich structure 2104.

In the illustrative example, design parameters 2118 may include at least one of dimensions 2130, materials 2132, location 2133, or other suitable parameters to describe the various components in sandwich structure 2104.

For example, dimensions 2130 and materials 2132 may be used to customize structural insert 2128 in a manner that meets weight 2116 that may be desired for sandwich structure 2104 to carry load 2114 as specified in input 2110. For example, dimensions 2130 and materials 2132 may be used to describe first number of parts 2134 and second number of parts 2136 in structural insert 2128.

In the illustrative examples, dimensions 2130 may take various forms. These forms may include those for the illustrative examples depicted in FIGS. 2-21.

Materials 2132 for first number of parts 2134 and second number of parts 2136 may be comprised of a number of materials selected from at least one of a composite material, a metal, aluminum, titanium, graphite, plastic, polycarbonate, glass, fiberglass, wood, concrete, steel, carbon fiber, para-aramid synthetic fiber, a carbon fiber reinforced thermoplastic, a carbon fiber thermoset polymer, or other suitable materials. The selection of materials 2132 also may be used to generate density 2138 for at least one of first number of parts 2134 or second number of parts 2136.

Dimensions 2130 may also include an identification of holes or other features that may be used to change density 2138 for at least one of first number of parts 2134 or second number of parts 2136. For example, dimensions 2130 may include identification of holes, voids, or other features that may be desirable to change density 2138. As a result, density 2138 for first number of parts 2134 may be different over different portions of first number of parts 2134 based on the load expected to be placed on or received by structural insert 2128 as specified by load 2114 in input 2110.

The changes or selection of density 2138 for different parts of structural insert 2128 may be used to reach weight 2116 for load 2114 at a specified input 2110. In this manner, weight savings may be achieved while providing the handling on processing of loads in a desired manner.

Further, dimensions 2130 and materials 2132 also may describe at least one of first layer 2122, second layer 2124, or core 2126. In the illustrative examples, first layer 2122 and second layer 2124 may be a number of layers of laminate comprising materials selected from of least one of steel, aluminum, a composite material, fiberglass, or carbon fiber.

In these illustrative examples, materials 2132 for at least one of first layer 2122 or second layer 2124 may be selected from of least one of steel, aluminum, a composite material, fiberglass, or carbon fiber.

Materials 2132 for core 2126 may be selected from at least one of fiberglass, paper, cardboard, wood, foam, steel, a composite material, a carbon fiber infused resin, or other suitable materials. The material selected may be based on the type of core used for core 2126. For example, core 2126 may be selected from one of a foam core, a honeycomb core, a composite core, or some other suitable type of core.

In this illustrative example, location 2133 describes the location of structural insert 2128 in sandwich structure 2104. Location 2133 may be identified from input 2110. For example, load 2114 may describe the location where a force may be applied to sandwich structure 2104. The location of the force may be used to identify location 2133 for structural insert 2128.

With design 2102, designer 2106 may run simulation 2140 for sandwich structure 2104. Based on the results of simulation 2140, adjustments may be made to design 2102 as needed to reach or meet input parameters 2112 in input 2110.

Additionally, design 2102 may be used by manufacturing system 2142 to manufacture sandwich structure 2104. In particular, at least one of first number of parts 2134 or second number of parts 2136 may be manufactured using additive manufacturing equipment 2144 in manufacturing system 2142.

With first layer 2122, second layer 2124, core 2126, first number of parts 2134 and second number of parts 2136, operator 2146 may assemble sandwich structure 2104. Operator 2146 may be, for example, a human operator or a robotic operator.

The illustration of structural sandwich environment 2100 in FIG. 21 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other types of manufacturing equipment may be used in place of or in addition to additive manufacturing equipment 2144. For example, molding equipment, composite manufacturing equipment, lathes, water jets, lasers, and other suitable types of equipment may be used to manufacture first number of parts 2134 and second number of parts 2136 in structural insert 2128.

Additionally, the different components shown in FIGS. 1-17 may be combined with components in FIG. 21, used with components in FIG. 21, or a combination of the two. Additionally, some of the components in FIGS. 1-17 may be illustrative examples of how components shown in block form in FIG. 21 can be implemented as physical structures.

Figure 22:
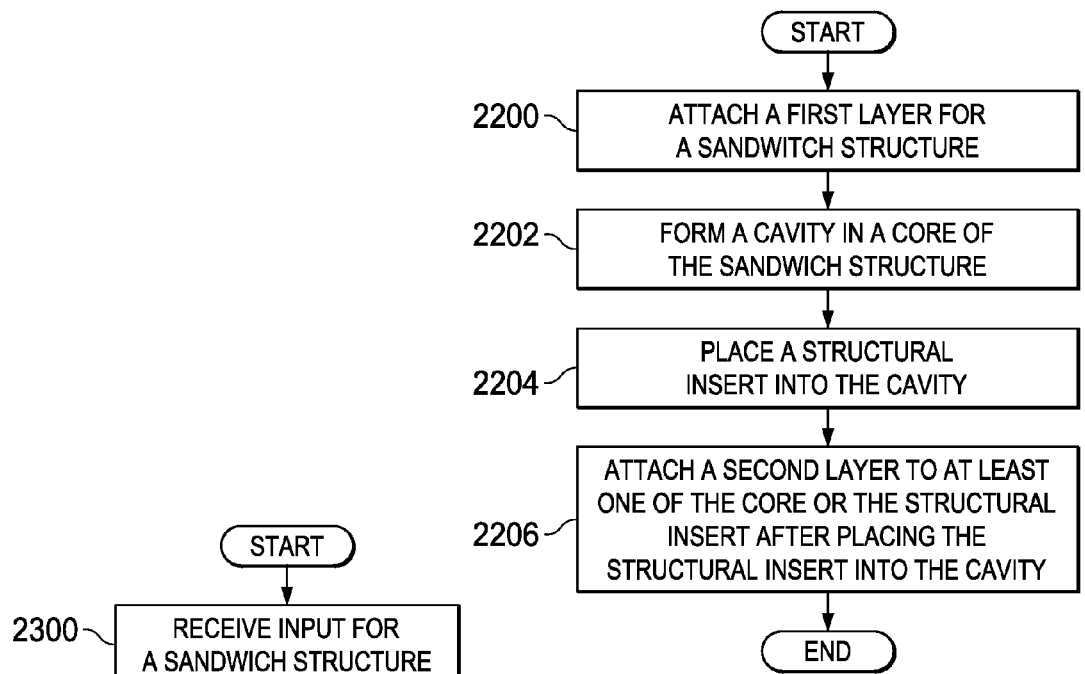
FIG. 22 is an illustration of a flowchart of a process for manufacturing a sandwich structure in accordance with an illustrative embodiment.

With reference next to FIG. 22, an illustration of a flowchart of a process for manufacturing a sandwich structure is depicted in accordance with an illustrative embodiment. The process illustrated in FIG. 22 may be implemented in structural sandwich environment 2100 in FIG. 21. In particular, one or more of the different operations may be implemented using manufacturing system 2142 or some other suitable component. The sandwich structure may be manufactured for use in a platform such as aircraft 100 in FIG. 1 as well as other platforms.

The process begins by attaching a first layer for a sandwich structure (operation 2200). The process then forms a cavity in a core of the sandwich structure (operation 2202). Thereafter, a structural insert is placed into the cavity (operation 2204).

The second layer is then attached to at least one of the core or the structural insert after placing the structural insert into the cavity (operation 2206), with the process terminating thereafter.

Figure 23:
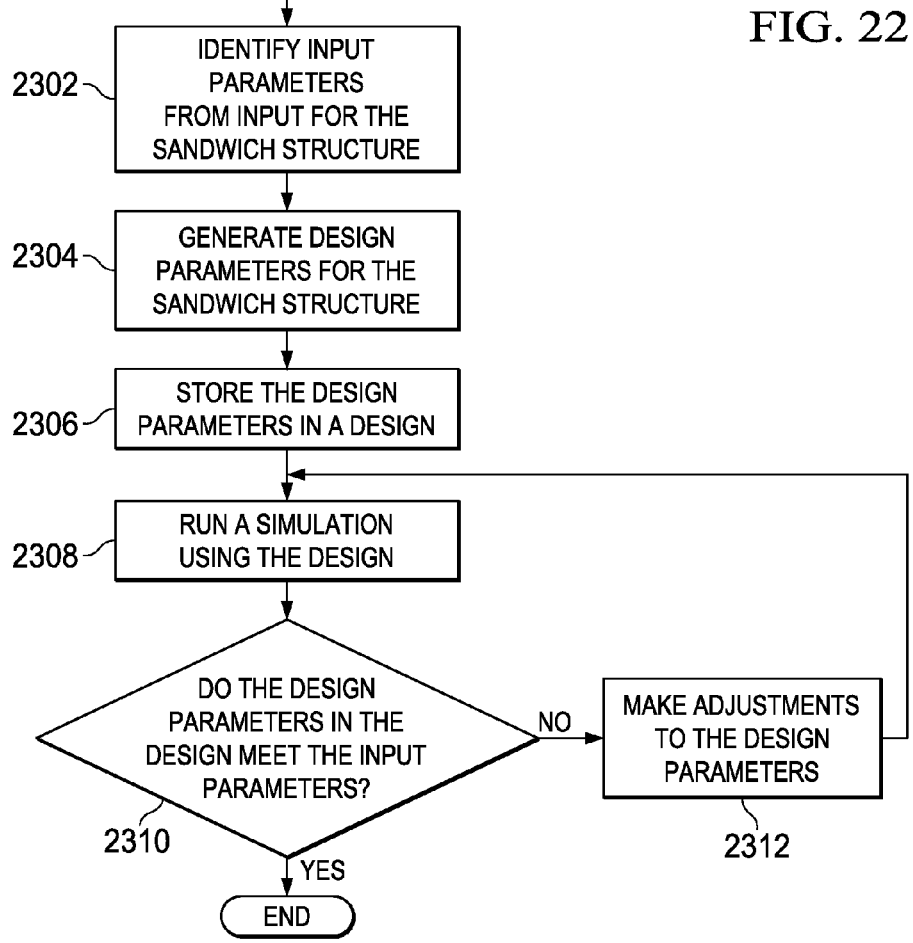
FIG. 23 is an illustration of a flowchart of a process for designing a sandwich structure in accordance with an illustrative embodiment.

With reference next to FIG. 23, an illustration of a flowchart of a process for designing a sandwich structure is depicted in accordance with an illustrative embodiment. The process illustrated in this flowchart may be implemented in designer 2106 in FIG. 21 in one illustrative example. The process may be used to generate design 2102 for sandwich structure 2104 in the illustrative example.

The process begins by receiving input for a sandwich structure (operation 2300). The process identifies input parameters from input for the sandwich structure (operation 2302). Input parameters may include, for example, a load that may be applied to the sandwich structure. The input parameters describing the load may describe the direction and magnitude of the load. Additionally, the parameters also may specify a desired weight for the sandwich structure for components in the sandwich structure.

The process then generates design parameters for the sandwich structure (operation 2304). The design parameters may include, for example, dimensions, materials, and other parameters for sandwich structures. In particular, these parameters may describe components such as a first layer, a second layer, a core, and a structural insert in the sandwich structure. The process then stores the design parameters in a design (operation 2306).

A simulation is then run using the design (operation 2308). Next, a determination is made as to whether the design parameters in the design meets the input parameters (operation 2310). If the design parameters in the design meet the input parameters, the process terminates. Otherwise, adjustments are made to the design parameters (operation 2312), with the process then returning to operation 2308.

Turning now to FIG. 24, an illustration of a flowchart of a process for handling a load in an aircraft is depicted in accordance with an illustrative embodiment. The process illustrated in FIG. 24 may be implemented in a sandwich structure, such as a honeycomb panel, in an aircraft such as aircraft 100 in FIG. 1.

The process begins by receiving a load at a honeycomb panel (operation 2400). In this illustrative example, the honeycomb panel comprises a first skin, a second skin, a honeycomb core located between the first skin and the second skin, and a structural insert located in a cavity in the honeycomb core. The structural insert has a first number of parts configured to receive the load and a second number of parts.

The process then spreads the load through a first number of parts in a structural insert (operation 2402), with the process turning thereafter. In the illustrative example, the load may be spread through the first number of parts such that the load spreads across the skin of the honeycomb panel. The skin may be the first skin or the second skin on either side of a core in the illustrative example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the cavity formed in operation 2202 may be performed prior to or after attaching the core to the first layer in operation 2200. As another example, the process for generating and designing a honeycomb structure also may include operations in which simulations performed in adjustments are made to the design based on how the results of a simulation work.

Illustrative embodiments of the disclosure may be described in the context of aircraft manufacturing and service method 2500 as shown in FIG. 25 and aircraft 2600 as shown in FIG. 26. Turning first to FIG. 25, an illustration of a block diagram of an aircraft manufacturing and service method is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of a block diagram of an aircraft is depicted in which an illustrative embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25. For example, a sandwich structure with a structural insert in accordance with an illustrative embodiment may be manufactured during component and subassembly manufacturing 2506. The sandwich structure may be implemented in aircraft 2600 during system integration 2508. Further, the sandwich structure with a structural insert in accordance with an illustrative embodiment may be implemented in aircraft 2600 during maintenance and service 2514. For example, a sandwich structure may be used to replace other sandwich structures during routine maintenance, refurbishment, upgrades, or other operations performed during maintenance and service 2514. As another example, the use of a sandwich structure with a structural insert in accordance with an illustrative embodiment in aircraft 2600 while aircraft 2600 is in service 2512 may reduce the operating expenses for the aircraft. For example, the reduction in weight may reduce fuel costs and may increase performance of aircraft 2600.

One or more apparatus embodiments, method embodiments, or a combination thereof may be utilized while aircraft 2600 is in service 2512 and/or during maintenance and service 2514 in FIG. 25. The use of a number of the different illustrative embodiments may substantially expedite the assembly of and/or reduce the cost of aircraft 2600.

Thus, one or more of the illustrative embodiments provide a method and apparatus for a sandwich structure to carry a load. In one illustrative embodiment, the sandwich structure includes a structural insert configured to spread the load across the surface of the sandwich structure.

In the illustrative examples, the structural insert is comprised of two or more parts. The first number of parts is configured to receive a load. This first number of parts is also configured to spread the load. The second number of parts is configured to be assembled with the first number of parts to form the structural inserts.

In illustrative examples, the different parts in the structural inserts may have a density that varies. The density may vary based on the type of material used, a density of holes, removal of material from areas in which a lower density is desired, or other suitable techniques. In this manner, the desired handling of a load may be achieved while reducing the weight of the sandwich structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of first parts and a second part, the plurality of first parts and the second part configured to fit entirely within a cavity in a sandwich structure; wherein the second part comprises at least one longitudinal member having a hole therein and is configured to engage the first plurality of parts within the cavity of the sandwich structure to form a structural insert in the sandwich structure, wherein the second part extends across a diameter of the cavity dividing the plurality of first parts into two sections;
wherein the sandwich structure comprises a first layer having a first opening, a second layer having a second opening, and a core having the cavity therein, configured to hold the structural insert so that the first opening, the hole, and the second opening provide a passage completely through the sandwich structure;
wherein the cavity is substantially circular or oval.

2. The apparatus of claim 1, wherein the structural insert is configured to spread a load across a surface of the sandwich structure.

3. The apparatus of claim 1, wherein the core is selected from one of a foam core, a honeycomb core, or a composite core.

4. The apparatus of claim 1, wherein the structural insert is manufactured using an additive manufacturing process.

5. The apparatus of claim 1, wherein a density for the first plurality of parts is different over different portions of the first plurality of parts based on a load expected.

6. The apparatus of claim 1, wherein the sandwich structure is a honeycomb sandwich panel and the honeycomb sandwich panel is located in a structure selected from one of a floor, a closet, and a wall.

7. The apparatus of claim 1, wherein the first layer and the second layer are a number of layers of laminate comprising materials selected from a least one of steel, aluminum, a composite material, fiberglass, or carbon fiber.

8. The apparatus of claim 1, wherein the first plurality of parts and the second plurality of parts are comprised of a number of materials selected from at least one of a composite material, a metal, aluminum, titanium, graphite, plastic, polycarbonate, glass, fiberglass, wood, concrete, steel, carbon fiber, para-aramid synthetic fiber, a carbon fiber reinforced thermoplastic, or a carbon fiber thermoset polymer.

9. The apparatus of claim 1, wherein the sandwich structure is located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

10. A honeycomb panel comprising:
a first skin;
a second skin;
a honeycomb core located between the first skin and the second skin; and
a structural insert located entirely in a cavity in the honeycomb core, wherein the structural insert has a plurality of first parts and a second part configured to fit within the cavity of the honeycomb core, the second part having at least one longitudinal member and a hole therein and configured to engage the plurality of first parts within the cavity of the honeycomb core, wherein the second part extends across a diameter of the cavity dividing the plurality of first parts into two sections;
wherein the first skin has a first opening, the second skin has a second opening;
wherein the first opening, the hole, and the second opening define a passage completely through the first skin, the second skin, and the honeycomb core;
wherein the cavity is substantially circular or oval.

11. The honeycomb panel of claim 10, wherein the structural insert is manufactured using an additive manufacturing process.

12. The honeycomb panel of claim 10, wherein a density of the first plurality of parts is different over different portions of the first plurality of parts based on a load expected.

13. A method for manufacturing a sandwich structure, the method comprising:
forming a cavity in a core of the sandwich structure;
placing a structural insert into the cavity of a core;
attaching the core to a first layer having a first opening;
forming the cavity in the core; and
attaching a second layer having a second opening to at least one of the core or the structural insert after placing the structural insert into the cavity;
wherein the structural insert is configured to receive a load and to fit within a cavity of the core, the structural insert comprising a plurality of first parts and a second part having at least one longitudinal member and a hole therein and configured to engage the plurality of first parts within the cavity of the core, wherein the second part extends across a diameter of the cavity dividing the plurality of first parts into two sections;
wherein the first opening, the hole, and the second opening define a passage completely through the first layer, the second layer, and the core;
wherein the cavity is substantially circular or oval.

14. The method of claim 13 further comprising:
identifying the load anticipated for the sandwich structure; and
designing the first plurality of parts and the second plurality of parts such that the first plurality of parts receives the load when assembled to form the structural insert within the sandwich structure.

15. The method of claim 13, wherein a density of the first plurality of parts is different over different portions of the first plurality of parts based on the load expected.

16. The method of claim 13, wherein the sandwich structure is a honeycomb sandwich panel and the honeycomb sandwich panel is located in a structure selected from one of a floor, a closet, and a wall.

17. The method of claim 13, wherein the core is selected from one of a foam core, a honeycomb core, or a composite core.

18. The method of claim 13, wherein the structural insert is manufactured using an additive manufacturing process.

19. A method for handling a load in an aircraft, the method comprising:
receiving the load at a honeycomb panel comprising a first skin, a second skin, a honeycomb core located between the first skin and the second skin, and a structural insert located entirely in a cavity in the honeycomb core, wherein the structural insert comprises a plurality of first parts and a second part having at least one longitudinal member and a hole therein and configured to engage the plurality of first parts within the cavity of the honeycomb core, wherein the second part extends across a diameter of the cavity dividing the plurality of first parts into two sections; and spreading the load through the plurality of first parts and the second part in the structural insert;

wherein a first opening in the first skin, the hole, and a second opening in the second skin define a passage completely through the first skin, the honeycomb core, the structural insert, and the second skin;

wherein the cavity is substantially circular or oval.

20. The method of claim 19, wherein the structural insert is manufactured using an additive manufacturing process.

* * * * *

UNITED STATES PATENT AND TRADEMARK OFFICE
CERTIFICATE OF CORRECTION

Page 1 of 1

PATENT NO. : 9,981,446 B2
APPLICATION NO. : 14/016691
DATED : May 29, 2018
INVENTOR(S) : Holemans It is certified that error appears in the above-identified patent and that said Letters Patent is hereby corrected as shown below:

In the Claims

Column 16, Line 19, change "the cavity of a core" to --the cavity of the core--
Column 16, Line 26, change "a cavity of the core" to --the cavity of the core--
Column 16, Line 40, change "the second plurality of parts" to --the second part--

Signed and Sealed this
Fourth Day of September, 2018

Andrei Iancu
*Director of the United States Patent and Trademark Office*